US008766566B2

(12) United States Patent
Baba et al.

(10) Patent No.: US 8,766,566 B2
(45) Date of Patent: Jul. 1, 2014

(54) SYSTEM FOR CAUSING TEMPERATURE RISE IN BATTERY

(75) Inventors: Hiroyasu Baba, Chiryu (JP); Kunio Iritani, Anjo (JP); Masao Tokunaga, Gamagori (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 195 days.

(21) Appl. No.: 13/330,901

(22) Filed: Dec. 20, 2011

(65) Prior Publication Data

US 2012/0153877 A1 Jun. 21, 2012

(30) Foreign Application Priority Data

Dec. 20, 2010 (JP) .................................. 2010-283170
May 27, 2011 (JP) .................................. 2011-118864

(51) Int. Cl.
*H02P 1/00* (2006.01)
*H02J 7/00* (2006.01)

(52) U.S. Cl.
USPC ............ 318/139; 320/134; 320/135; 320/136; 320/143; 320/144; 320/150

(58) Field of Classification Search
CPC ....... H02J 7/0016; H02J 7/0091; H02J 7/345; Y02T 10/705; Y02T 10/7005; Y02T 10/7044; Y02T 10/92
USPC .......... 318/139, 471, 599, 722; 320/150, 153, 320/134, 136, 167; 340/635, 584, 636.1, 340/636.15; 324/433, 443, 519, 522, 324/750.11
See application file for complete search history.

(56) References Cited

U.S. PATENT DOCUMENTS

| | | | | |
|---|---|---|---|---|
| 6,198,254 | B1 * | 3/2001 | Satake et al. ................... | 320/132 |
| 6,242,887 | B1 * | 6/2001 | Burke ............................ | 320/104 |
| 6,297,618 | B2 * | 10/2001 | Emori et al. ................... | 320/132 |
| 6,639,408 | B2 * | 10/2003 | Yudahira et al. .............. | 324/434 |
| 7,199,537 | B2 | 4/2007 | Okamura et al. | |

(Continued)

FOREIGN PATENT DOCUMENTS

| | | |
|---|---|---|
| CN | 101242105 | 8/2008 |
| JP | P2005-312160 A | 11/2005 |

(Continued)

OTHER PUBLICATIONS

Office Action (2 pages) dated Apr. 16, 2013, issued in corresponding Japanese Application No. 2010-283170 and English translation (3 pages).

(Continued)

*Primary Examiner* — Rita Leykin
(74) *Attorney, Agent, or Firm* — Nixon & Vanderhye PC

(57) ABSTRACT

A battery temperature rise causing system has a converting unit for converting voltage of electric power held in one of a rechargeable battery and an accumulator and applies the converted voltage to the other one, and a control unit controlling the converting unit to alternately perform first transfer of electric power from the battery to the accumulator and second transfer of electric power from the accumulator to the battery while changing the first transfer for the second transfer each time the battery voltage reaches a lower limit and changing the second transfer for the first transfer each time the battery voltage reaches an upper limit, and to increase temperature of the battery due to heat generated by electric current flowing through the battery during the electric power transfer.

22 Claims, 10 Drawing Sheets

(56) References Cited

U.S. PATENT DOCUMENTS

| | | | |
|---|---|---|---|
| 7,492,129 B2* | 2/2009 | Aridome | 320/150 |
| 7,583,053 B2* | 9/2009 | Kamohara | 320/106 |
| 7,629,755 B2* | 12/2009 | Yaguchi | 318/139 |
| 7,791,216 B2* | 9/2010 | Xu et al. | 307/9.1 |
| 7,795,844 B2* | 9/2010 | Ichikawa et al. | 320/134 |
| 8,169,199 B2* | 5/2012 | Okamura et al. | 323/222 |
| 8,248,033 B2 | 8/2012 | Nishi et al. | |
| 8,395,355 B2* | 3/2013 | Kaita et al. | 320/134 |
| 8,482,945 B2* | 7/2013 | Kojima | 363/53 |
| 8,589,096 B2* | 11/2013 | Kim et al. | 702/63 |
| 2011/0298427 A1 | 12/2011 | Uemura et al. | |
| 2012/0112695 A1 | 5/2012 | Nishi et al. | |
| 2012/0140538 A1* | 6/2012 | Martinelli | 363/127 |

FOREIGN PATENT DOCUMENTS

| | | |
|---|---|---|
| JP | 2010-93871 | 4/2010 |
| JP | 2010-119171 | 5/2010 |
| JP | 2011-18533 | 1/2011 |
| JP | 2011-254673 | 12/2011 |

OTHER PUBLICATIONS

Office Action (13 pages) dated Dec. 17, 2013, issued in corresponding Chinese Application No. 201110430081.5 and English translation (13 pages).

* cited by examiner

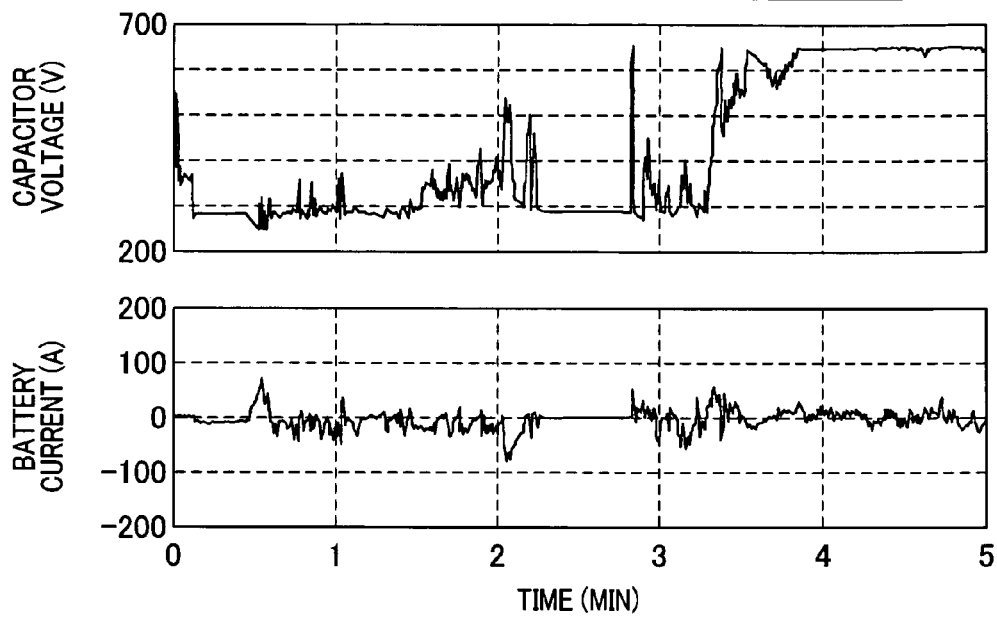
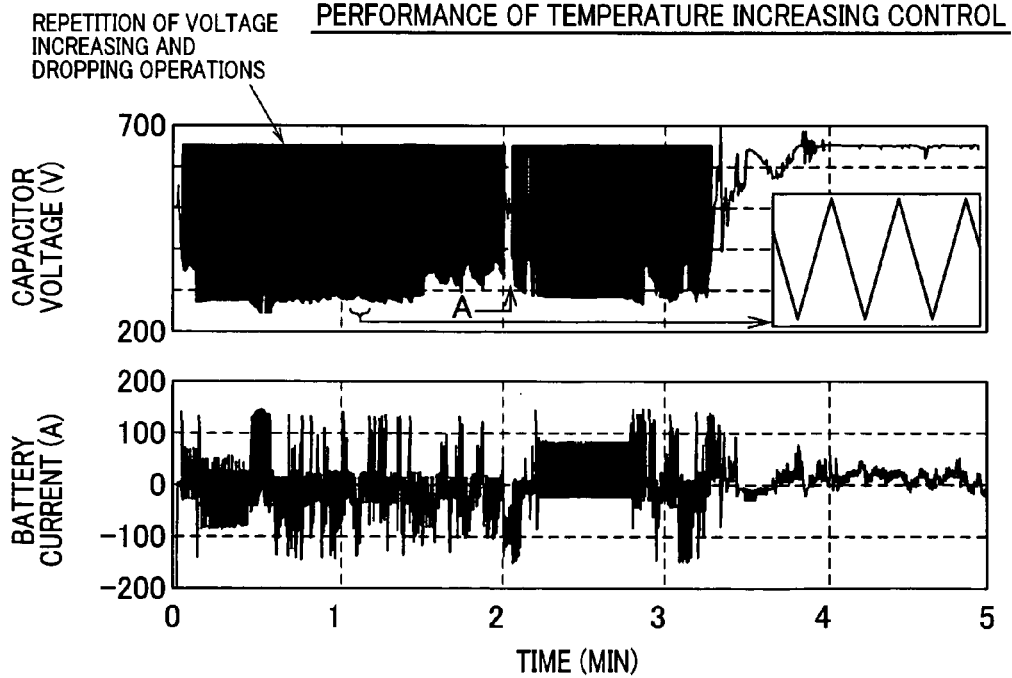

SYSTEM FOR CAUSING TEMPERATURE RISE IN BATTERY

CROSS-REFERENCE TO RELATED APPLICATION

This application is based upon and claims the benefit of priority of the prior Japanese Patent Application 2010-283170 filed on Dec. 20, 2010 and the prior Japanese Patent Application 2011-1183864 filed on May 27, 2011, so that the contents of which are incorporated herein by reference.

BACKGROUND OF THE INVENTION

1. Field of the Invention

The present invention relates generally to a system for rapidly causing a temperature rise in a battery of a hybrid vehicle or an electric car, and more particularly to the system for rapidly causing a temperature rise in the battery while assuring the safety of the battery and the system for rapidly causing a temperature rise in the battery while keeping the voltage of electric power, applied from the battery to an electric motor, at a value required to drive the vehicle or car at a desired speed.

2. Description of Related Art

A voltage converting device mounted on a hybrid vehicle or an electric car rapidly increases the temperature of a rechargeable secondary battery. This device is, for example, disclosed in Published Japanese Patent First Publication No. JP2005-312160.

In this device of the Publication, a temperature sensor detects a temperature of a direct-current (dc) power source. When the source temperature is lower than a reference value, the device performs a temperature increasing control for the source. More specifically, a control unit controls a boost converter to repeatedly perform a voltage increasing operation and a voltage dropping operation. In the voltage increasing operation, electric power is sent from the power source to a capacitor through resistors of the power source. In the voltage dropping operation, electric power is sent from the capacitor to the power source through the resistors. Therefore, the temperature of the source heated by the resistors is increased. When the source temperature exceeds the reference value, the temperature increasing control is stopped, and the control unit controls the boost converter to perform a normal operation. In this normal operation, the voltage increasing operation, the voltage dropping operation or repetition of the increasing and dropping operations is performed. The voltage of the electric power accumulated in the capacitor is applied to the motor as a driving voltage, required to drive the motor at a desired speed.

However, when a rechargeable battery such as a lithium-ion rechargeable battery or the like is used as the dc power source, the internal resistance of the battery is increased during a low temperature period of time in which the atmospheric temperature is, for example, lower than the freezing point. Therefore, when large electric current flows through the battery at a low frequency during the voltage rising and dropping operations repeatedly performed, a change in the voltage of the battery is increased. In this case, the battery voltage sometimes exceeds its upper limit or becomes lower than its lower limit. Therefore, it is difficult to rapidly increase the battery temperature while assuring the safety of the battery (first drawback of the voltage converting device).

For example, in the case of the lithium-ion rechargeable battery, when the battery is overcharged so as to exceed the upper limit of the battery voltage, electrolytic solution of the battery is sometimes oxidized near the positive electrode of the battery, the crystal structure of the positive electrode is sometimes broken or damaged, and lithium is sometimes deposited on the negative electrode of the battery. In contrast, when the battery is over-discharged so as to become lower than the lower limit of the battery voltage, copper composing the negative electrode is sometimes dissolved away by the electrolyte. In the same manner, any rechargeable battery other than the lithium-ion rechargeable battery is also damaged when being overcharged or over-discharged.

Further, the driving voltage applied from the capacitor to the motor is changeable. When the engine of the vehicle or car starts driving or when the motor is operated to run the vehicle or car at a high speed, this driving voltage is sometimes increased to the maximum value such as 650 V. In this situation, when the temperature increasing control is performed, the voltage of the capacitor is considerably decreased during the voltage drop operation to be lower than the required driving voltage, and a voltage lower than the driving voltage, which is insufficient to drive the motor, is undesirably applied to the motor. Therefore, it is difficult to generate a driving torque, required to start the running of the vehicle or car or to run the vehicle or car at a desired speed, in the motor (second drawback of the voltage converting device).

SUMMARY

Hence it is desired to provide a system for rapidly causing a temperature rise in a battery while assuring the safety of the battery.

It is also desired to provide a system for rapidly causing a temperature rise in a battery while applying a voltage, required to drive an electric motor, to the motor.

According to a first aspect of this disclosure, the first object is achieved by the provision of a battery temperature rise causing system comprising a rechargeable battery, an accumulator, a voltage converting unit, and a control unit. The rechargeable battery holds electric power. The accumulator accumulates the electric power received from the battery. The voltage converting unit performs voltage conversion of the electric power between the battery and the accumulator. The control unit receives a battery temperature of the battery and controls the converting unit, when the received battery temperature is lower than a reference value, to increase the battery temperature while alternately transferring electric power from the accumulator to the battery and from the battery to the accumulator. Further, the control unit receives a battery voltage of the battery and controls the converting unit to change a transfer direction of the electric power between the battery and the capacitor each time the received battery voltage reaches a battery upper limit or a battery lower limit.

With this structure of the system, the control unit controls the converting unit to change the transfer of the electric power from the accumulator to the battery to the transfer of the electric power from the battery to the accumulator each time the battery voltage reaches the battery upper limit and to change the transfer of the electric power from the battery to the accumulator to the transfer of the electric power from the accumulator to the battery each time the battery voltage reaches the battery lower limit. Therefore, the control unit controls the converting unit to change the battery voltage within the range from the battery upper limit to the battery lower limit.

Accordingly, the system can prevent the battery from being overcharged or over-discharged so as to prevent the battery from being damaged or broken, and can assure the safety of the battery.

Further, because the control unit controls the converting unit to alternately transfer the electric power from the accumulator to the battery and transfer the electric power from the battery to the accumulator, electric current flows through the battery so as to generate heat in the battery. Accordingly, when the battery temperature is lower than the reference value, the system can rapidly cause a temperature rise in the battery.

According to a second aspect of this disclosure, the first object is achieved by the provision of a battery temperature rise causing system comprising the rechargeable battery, the accumulator, the voltage converting unit, and a control unit that receives a battery temperature of the battery and controls the converting unit, when the received battery temperature is lower than a reference value, to increase the battery temperature while alternately transferring electric power from the accumulator to the battery and from the battery to the accumulator. Further, the control unit stores in advance data indicating a relation between frequency in the transfer of the electric power and calorific power, generated in the battery due to the alternated transfer of the electric power, for each of levels of the battery temperature on condition that a battery voltage of the battery is lower than a battery upper limit and is higher than a battery lower limit, determines an optimum frequency at which the calorific power corresponding to the received battery temperature is maximized, and controls the converting unit to change a transfer direction of the electric power between the battery and the capacitor at the optimum frequency.

With this structure of the system, the control unit controls the converting unit to alternately transfer electric power from the battery to the accumulator and transfer electric power from the accumulator to the battery while changing the battery voltage within the range from the battery upper limit to the battery lower limit. Accordingly, the system can prevent the battery from being overcharged or over-discharged so as to prevent the battery from being damaged or broken, and can assure the safety of the battery.

Further, the control unit determines the optimum frequency, at which the calorific power is maximized, from the relation between the frequency and the calorific power corresponding to the received battery temperature and controls the converting unit to change the transfer direction of the electric power at the optimum frequency. Accordingly, when the battery temperature is lower than the reference value, the system can rapidly cause a temperature rise in the battery.

According to a third aspect of this disclosure, the first object is achieved by the provision of a battery temperature rise causing system comprising the rechargeable battery, the accumulator, the voltage converting unit, and a control unit that receives a battery temperature of the battery and controls the converting unit, when the received battery temperature is lower than a reference value, to increase the battery temperature while alternately transferring electric power from the accumulator to the battery and from the battery to the accumulator. Further, the control unit stores in advance data indicating a relation between frequency in the transfer of the electric power and battery current flowing through the battery, for each of levels of battery temperature on condition that a battery voltage of the battery is lower than a battery upper limit and is higher than a battery lower limit, determines an optimum frequency at which calorific power generated in the battery due to the alternated transfer of the electric power is maximized, by using the relation corresponding to the level of the received battery temperature, and controls the converting unit to change a transfer direction of the electric power between the battery and the capacitor at the optimum frequency.

With this structure of the system, the control unit controls the converting unit to alternately transfer electric power from the battery to the accumulator and transfer electric power from the accumulator to the battery while changing the battery voltage within the range from the battery upper limit to the battery lower limit. Accordingly, the system can prevent the battery from being overcharged or over-discharged so as to prevent the battery from being damaged or broken, and can assure the safety of the battery.

Further, the control unit knows in advance an impedance of the battery depending on the battery temperature and the frequency, and can determine the calorific power from the impedance and the battery current. Therefore, the control unit determines the optimum frequency, at which the calorific power is maximized, from the relation between the frequency and the received battery temperature and controls the converting unit to change the transfer direction of the electric power at the optimum frequency. Accordingly, when the battery temperature is lower than the reference value, the system can rapidly cause a temperature rise in the battery.

According to a fourth aspect of this disclosure, the second object is achieved by the provision of a battery temperature rise causing system comprising a rechargeable battery, an accumulator, a voltage converting unit, an inverter and a control unit. The rechargeable battery holds electric power. The accumulator accumulates the electric power received from the battery or accumulates electric power regenerated in an electric motor. The voltage converting unit performs voltage conversion of the electric power between the battery and the accumulator. The inverter converts an accumulated power voltage of the electric power accumulated in the accumulator into an alternating current voltage and applies the alternating current voltage to the electric motor to drive the electric motor during running of a vehicle. The control unit receives a battery temperature of the battery and controls the converting unit, when the received battery temperature is lower than a reference value, to increase the battery temperature while alternately transferring electric power from the accumulator to the battery and transferring electric power from the battery to the accumulator. Further, the control unit determines a driving voltage, required to drive the electric motor, according to a running condition of the vehicle, receives the accumulated power voltage of the accumulator and a battery voltage of the battery, and controls the converting unit according to the driving voltage, the accumulated power voltage and the battery voltage to alternately perform the transfers of the electric power.

With this structure of the system, the control unit controls the converting unit to alternately transfer electric power from the accumulator to the battery and transfer electric power from the battery to the accumulator. Therefore, an electric current flows through the battery so as to generate heat in the battery. Accordingly, the system can rapidly cause a temperature rise in the battery.

Further, the control of the control unit is performed according to the driving voltage. Therefore, the system can reliably apply the driving voltage, required to drive the motor, to the motor.

Accordingly, the system can rapidly causing a temperature rise in the battery while applying the driving voltage, required to drive the motor, to the motor.

Preferably, the control unit controls the converting unit to alternately perform the transfers of the electric power when the determined driving voltage is lower than a predetermined threshold value being equal to a maximum of a voltage required to drive the electric motor while the accumulated power voltage is higher than the determined driving voltage.

With this structure of the system, the driving voltage is changeable and depends on the running condition of the vehicle. When the vehicle starts running or is now running at a high speed, the motor requires the maximum driving voltage (e.g., 650V), and the driving voltage reaches the predetermined threshold value. Further, to reliably apply the driving voltage to the motor during a temperature increasing control performed under control of the control unit, the accumulated power voltage should be higher than the determined driving voltage. In this situation, when the determined driving voltage is increased to the predetermined threshold value, the accumulated power voltage is increased to a high value higher than the predetermined threshold value during the temperature increasing control, and the accumulator is sometimes damaged due to the high voltage of the electric power accumulated in the accumulator.

Because the control unit controls the converting unit to alternately perform the transfers of the electric power when the determined driving voltage is lower than the predetermined threshold value, the system can prevent the accumulator from being damaged.

BRIEF DESCRIPTION OF THE DRAWINGS

FIG. 12 shows a change of a capacitor voltage and a change of a battery current when no temperature increasing control is performed; and FIG. 13 shows a change of a capacitor voltage and a change of a battery current when a temperature increasing control is performed according to the third embodiment.

DETAILED DESCRIPTION OF THE PREFERRED EMBODIMENTS

Figure 1:
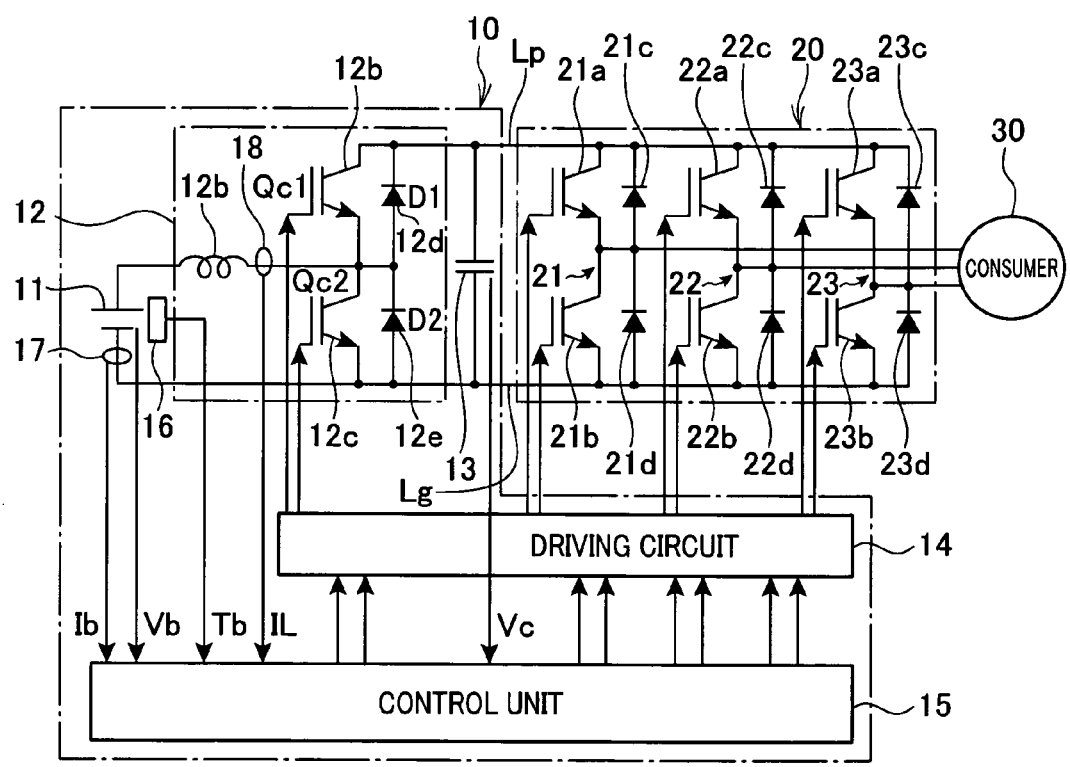
FIG. 1 is a structure view of an electric current consumer driving apparatus with a battery temperature rise causing system according to the first embodiment of the present invention.

Embodiments of the present invention will now be described with reference to the accompanying drawings, in which like reference numerals indicate like parts, members or elements throughout the specification unless otherwise indicated.

First Embodiment

FIG. 1 is a structure view of an electric current consumer driving apparatus with a battery temperature rise causing system according to the first embodiment. As shown in FIG. 1, an electric current consumer driving apparatus has a battery temperature rise causing system 10, an inverter 20, and an electric current consumer 30 such as an inverter or an electric motor.

The temperature rise causing system 10 can be used for an electric car such as a hybrid vehicle or a plug-in hybrid vehicle to rapidly warm or heat a rechargeable battery of the car. The system 10 has a rechargeable secondary battery 11 for holding electric power, an electric power accumulator 13 such as a capacitor for accumulating the electric power transferred from the battery 11, a voltage converting unit 12 for performing voltage conversion of the electric power between the battery 11 and the accumulator 13, a driving circuit 14 for outputting driving signals to the converting unit 12 and the inverter 20 to drive the converting unit 12 and the inverter 20, and a control unit 15 for controlling the circuit 14 to output the driving signals to the converting unit 12 and the inverter 20 in a normal operation and to output the driving signals to the converting unit 12 for the purpose of increasing a temperature Tb of the battery 11 in a temperature increasing control.

The battery 11 has a series of battery cells (not shown). As each cell, a lithium-ion rechargeable battery is used. The battery 11 is used as a power source for driving the current consumer 30. A battery temperature detector 16 is disposed near the battery 11 to detect the temperature of the battery 11. Data of the detected battery temperature Tb are sent to the control unit 15. A voltage detecting unit (not shown) detects a voltage Vb of the battery 11. A battery current detector 17 detects a battery current Ib flowing through the battery 11. Data of the detected battery current Ib and data of the detected battery voltage Vb are sent to the control unit 15.

The converting unit 12 acts as a boost converter for performing a voltage conversion between the battery 11 and the accumulator (hereinafter, called a capacitor) 13. Therefore, the unit 12 denotes a DC-DC (direct current to direct current) converter. The unit 12 has a reactive element 12a, a first switching element 12b (Qc1), a second switching element 12c (Qc2), a first diode 12d (D1), and a second diode 12e (D2). The reactive element 12a has an end connected with the positive electrode of the battery 11 and has the other end connected with a connection point of the switching elements 12b and 12c. A reactor current detector 18 detects a reactor current (or a conversion current) IL flowing through the element 12a, and outputs data of the current IL to the control unit 15.

Each of the switching elements 12b and 12c is formed of an insulated gate bipolar transistor (IGBT). The elements 12b and 12c are serially connected with each other between a power line Lp and a ground line Lg of the inverter 20. More specifically, the collector of the element 12b is connected with the power line Lp, and the emitter of the element 12b is connected with the collector of the element 12c. The ground line Lg is connected with the emitter of the element 12c and the negative electrode of the battery 11. The diode 12d is connected with the collector and the emitter of the element 12b such that a diode current flows from the emitter to the collector. The diode 12e is connected with the collector and the emitter of the element 12c such that a diode current flows from the emitter to the collector. Each of the diodes 12d and 12e acts as a free wheeling diode (FWD).

The capacitor 13 has ends, respectively, connected with the power line Lp and the ground line Lg. The capacitor 13 disposed on the input side of the inverter 20 smoothes a direct-current voltage applied from the converting unit 12 and applies the smoothed voltage to the inverter 20. A voltage detecting unit (not shown) detects the electric potential difference between the ends of the capacitor 13 as a capacitor voltage (or an accumulated power voltage) Vc and outputs the capacitor voltage Vc to the control unit 15.

The driving circuit 14 outputs driving signals to the switching elements 12b and 12c of the unit 12 and the inverter 20 according to instructions of the control unit 15 to drive the unit 12 and the inverter 20. The circuit 14 and the unit 15 may be integrally formed.

The control unit 15 receives an instruction, indicating a driving of the current consumer 30, from an electronic control unit (not shown) disposed on the outside of the driving apparatus. In response to this instruction, the control unit 15 controls the circuit 14 to drive the converting unit 12 and the inverter 20. In the electronic control unit, a microcomputer with a central processing unit (CPU), a read only memory (ROM), an electrically erasable and programmable ROM (EEPROM), a random access memory (RAM) and the like executes predetermined functions according to software programs stored in ROM and the like.

The control unit 15 has a function for causing a rise of the temperature Tb in the battery 11. More specifically, a reference value Tth is, for example, preset at the freezing point (i.e., zero degree Celsius). When the battery 11 is located in the environment lower than the freezing point, it is difficult to start running the vehicle or car or to run the vehicle or car at a desired speed. Therefore, the battery 11 should be warmed up. The reference value Tth can be appropriately set according to characteristics of the battery cells composing the battery 11.

When the battery temperature Tb is equal to or higher than the reference value Tth, it is not required to warm the battery 11. Therefore, the control unit 15 controls the driving circuit 14 to drive the converting unit 12 and the inverter 20 in the normal operation. In contrast, when the battery temperature Tb is lower than the reference value Tth, the control unit 15 performs a temperature increasing control. That is, the unit 15 controls the converting unit 12 through the driving circuit 14 to increase the battery temperature Tb while alternately performing a first transfer of the electric power from the capacitor 13 to the battery 11 and a second transfer of the electric power from the battery 11 to the capacitor 13 in the electric power transfer between the battery 11 and the capacitor 13. During the electric power transfer, an electric current flows through the battery 11, and the battery 11 is warmed.

Further, in this temperature increasing control, the control unit 15 controls the converting unit 12 while preventing the battery voltage Vb from exceeding a battery upper limit Vbu and preventing the battery voltage Vb from falling below a battery lower limit Vbd. In other words, the control unit 15 controls the transfer of electric power between the battery 11 and the capacitor 13 while placing the battery voltage Vb in the range from the upper limit Vbu to the lower limit Vbd. Therefore, the control unit 15 can prevent the battery 11 from being overcharged or over-discharged.

Then, when the battery temperature Tb is increased to the reference value Tth, the control unit 15 controls the driving circuit 14 to drive the converting unit 12 and the inverter 20, and the unit 12 and the inverter 20 perform the normal operation according to signals sent from the circuit 14 to drive the electric consumer 30. In this normal operation, the converting unit 12 alternately performs a voltage increasing operation and a voltage dropping operation. In the increasing operation, electric power of the battery 11 is transferred to the capacitor 13 to increase the capacitor voltage Vc. In the dropping operation, electric power of the capacitor 13 is returned to the battery 11 to drop the capacitor voltage Vc.

In response to signals sent from the driving circuit 14, the inverter 20 converts the capacitor voltage Vc denoting a direct current (dc) voltage into an alternating current (ac) voltage and applies this ac voltage to the consumer 30 to drive the consumer 30. Further, the inverter 20 can convert an ac voltage of electric power regenerated in the consumer 30 into a do voltage to supply the regenerated electric power of this dc voltage to the capacitor 13 or the battery 11 through the converting unit 12.

The inverter 20 has a u-phase arm 21, a v-phase arm 22 and a w-phase arm 23. The u-phase arm 21 has switching elements 21a and 21b serially connected with each other. The v-phase arm 22 has switching elements 22a and 22b serially connected with each other. The w-phase arm 23 has switching elements 23a and 23b serially connected with each other. Bases of the elements 21a, 21b, 22a, 22b, 23a and 23b are connected with the driving circuit 14 to receive signals of the circuit 14. Collectors of the switching elements 21a, 22a and 23a are connected with the power line Lp, and emitters of the switching elements 21a, 22a and 23a are connected with collectors of the switching elements 21b, 22b and 23b, respectively. Emitters of the switching elements 21b, 22b and 23b are connected with the ground line Lg. Therefore, the arms 21 to 23 are disposed in parallel to one another. The u-phase arm 21 further has a diode 21c connected with the element 21a and a diode 21d connected with the element 21b such that a diode current flows from the emitter to the collector of the corresponding element. The v-phase arm 22 further has a diode 22c connected with the element 22a and a diode 22d connected with the element 22b such that a diode current flows from the emitter to the collector of the corresponding element. The w-phase arm 23 further has a diode 23c connected with the element 23a and a diode 23d connected with the element 23b such that a diode current flows from the emitter to the collector of the corresponding element. Each of the elements 21a, 21b, 22a, 22b, 23a and 23b is formed of an IGBT. Each of the diodes 21c, 21d, 22c, 22d, 23c and 23d acts as an FWD.

The consumer 30 is, for example, formed of a three-phase permanent-magnetic synchronous motor having a u-phase coil, a v-phase coil and a w-phase coil. Ends of these three coils are connected with one another at a central point in a Y shape. The other end of the u-phase coil is connected with the emitter of the element 21a and the collector of the element 21b. The other end of the v-phase coil is connected with the emitter of the element 22a and the collector of the element 22b. The other end of the w-phase coil is connected with the emitter of the element 23a and the collector of the element 23b.

The control unit 15 performs a switching control for the switching elements 21a, 21b, 22a, 22b, 23a and 23b of the inverter 20 through the driving circuit 14, and controls an electric current flowing through each coil of the consumer 30. Therefore, an electric motor representing the consumer 30 generates an instructed driving torque to drive wheels of a hybrid vehicle or an electric car.

The consumer 30 may be connected with an engine of the vehicle or car so as to have a generator function and an electric motor function. As the generator function, the consumer 30 generates electric power from a rotational power generated in the engine. As the electric motor function, the consumer 30 supplies electric power, required to start the engine, to the engine.

Figure 2:
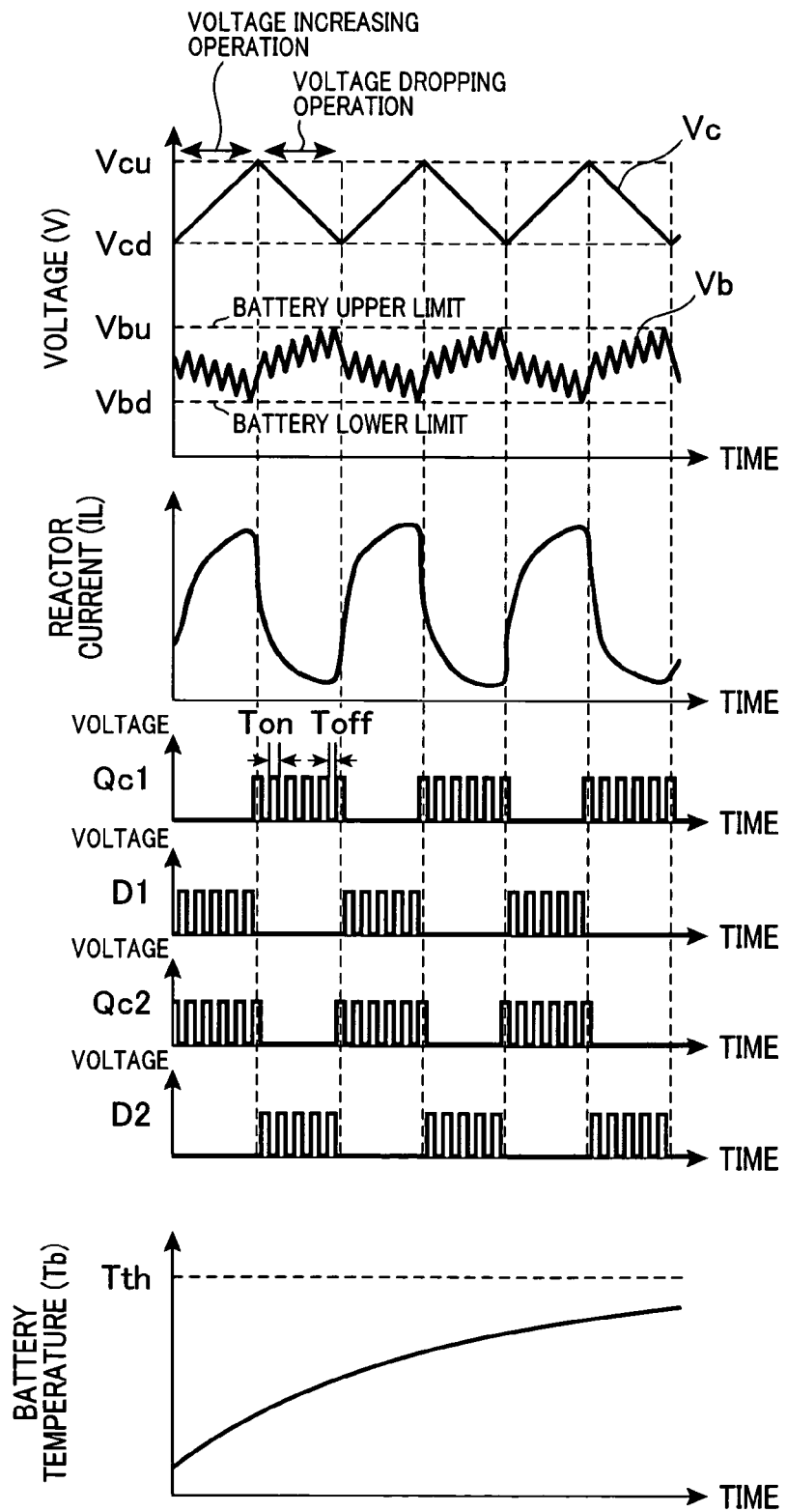
FIG. 2 is a timing chart of voltage, current and temperature in the system shown in FIG. 1.

Next, an operation of the battery temperature rise causing system 10 is now described below with reference to FIG. 1 and FIG. 2. FIG. 2 is a timing chart of the capacitor voltage Vc, the battery voltage Vb, the reactor current IL, currents flowing through the elements and diodes, and the battery temperature Tb in the system 10. In the system 10, the control unit 15 instructs the driving circuit 14 to output driving signals to the respective switching elements of the unit 12 and the inverter 20, and each switching element is turned on or off in response to the corresponding driving signal of the circuit 14.

In the voltage increasing operation for increasing the capacitor voltage V0, the switching element 12b (Qc1) is always set in the off state, while the switching element 12c (Qc2) is repeatedly turned on and off to be alternately set in the on state and the off state. More specifically, when the element 12c (Qc2) is turned on, an electric current flows from the battery 11 to the element 12c (Qc2) through the reactive element 12a, and electric energy is accumulated in the element 12a.

That is, this current flows through the battery 11. Then, the element 12c (Qc2) is turned off to be set in the off state, and an electric current flows from the battery 11 to the capacitor 13 through the reactive element 12a and the diode 12d (D1) in that order. That is, this current flows through the battery 11. The flowing direction of current from the battery 11 to the element 12a is defined to be positive, and the other flowing direction from the element 12a to the battery 11 is defined to be negative. During the voltage increasing operation, the current flows in the positive direction, and the voltage at the end of the element 12a facing the battery 11 becomes equal to the battery voltage Vb. Therefore, the capacitor 13 is charged with electric power of a boost voltage higher than the voltage Vb.

As shown in FIG. 2, when the switching of the element 12c (Qc2) is driven at a predetermined duty (or a predetermined duty ratio) DUTY to perform the voltage increasing operation, the element 12c (Qc2) is alternately set in the on state and the off state so as to discharge electric power from the battery 11 and to charge this discharged electric power to the capacitor 13. Therefore, the voltage Vb of the battery 11 is gradually reduced, and the voltage Vc of the capacitor 13 is gradually increased. When the battery voltage Vb is dropped to the lower limit Vbd, this voltage increasing operation is stopped. Further, when the capacitor voltage Vc is increased to a capacitor upper limit Vcu, this voltage increasing operation is stopped.

The duty DUTY is expressed by Duty=Ton/(Ton+Toff). The symbol Ton denotes a high level period of the driving signal, and the symbol Toff denotes a low level period of the driving signal. Each on state of the element 12c continues for the on state period Ton, and each off state of the element 12c continues for the off state period Toff. The capacitor voltage Vc reached in the voltage increasing operation is expressed by the relation Vc=$\{1/(1-\text{Duty})\} \times$Vb.

In contrast, in the voltage dropping operation for dropping the capacitor voltage Vc, the switching element 12c (Qc2) is always set in the off state, while the switching element 12b (Qc1) is repeatedly turned on and off to be alternately set in the on state and the off state. More specifically, when the element 12b (Qc1) is turned on, an electric current flows from the capacitor 13 to the battery 11 through the element 12b (Qc1) and the reactive element 12a in that order, and electric energy is accumulated in the element 12a. Then, the switching element 12b (Qc1) is turned off to be set in the off state, and an electric current flows from the reactive element 12a to the diode 12e (D2) through the battery 11. Because the current flows in the negative direction during the voltage dropping operation, the voltage of the other end of the element 12a facing the diode 12e (D2) becomes zero. Therefore, electric power of a dropped voltage is accumulated in the battery 11.

As shown in FIG. 2, when the switching of the element 12b (Qc1) is driven at the described-above duty DUTY to perform in the voltage dropping operation, the element 12b (Qc1) is alternately set in the on state and the off state so as to discharge electric power from the capacitor 13 and to charge this discharged electric power to the battery 11. Therefore, the voltage Vc of the capacitor 13 is gradually reduced, and the voltage Vb of the battery 11 is gradually increased. When the battery voltage Vb is increased to the upper limit Vbu, this voltage dropping operation is stopped. Further, when the capacitor voltage Vc is decreased to a capacitor lower limit Vcd, this voltage dropping operation is stopped.

Each on state of the element 12b (Qc1) continues for the on state period Ton, and each off state of the element 12b (Qc1) continues for the off state period Toff. The battery voltage Vb reached in the voltage dropping operation is expressed by the relation Vb=Duty$\times$Vc.

In the temperature increasing control for increasing the temperature of the battery 11, the voltage increasing operation and the voltage dropping operation are alternately performed such that a battery current Ib flows through the battery 11 so as to generate heat in the battery 11. Therefore, the battery 11 is warmed, and a rise of the battery temperature Tb is caused. By using an internal resistance R of the battery 11, calorific power Q generated in the battery 11 is expressed by the relation Q=$(\text{Ib})^2 \times$R.

Figure 3:
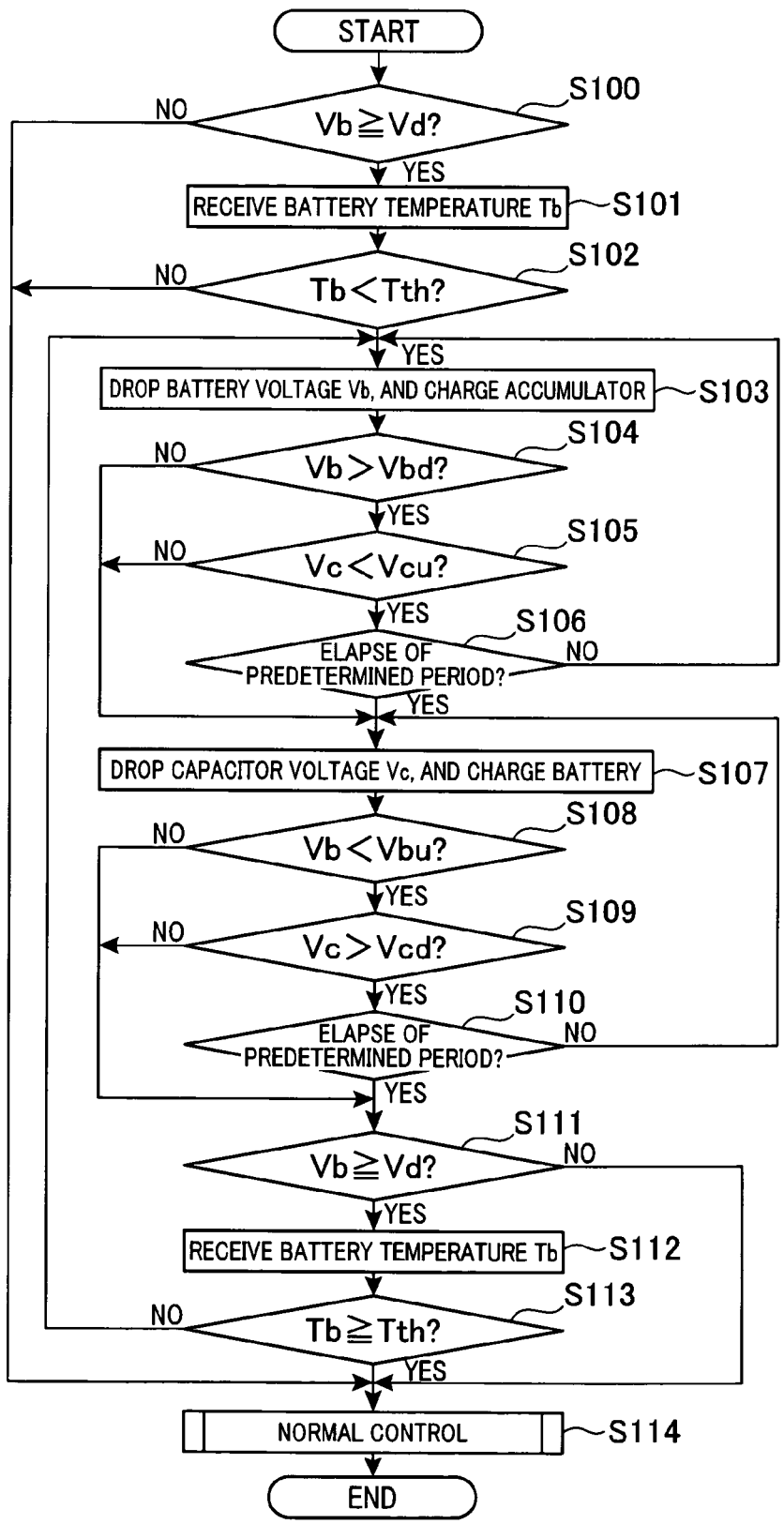
FIG. 3 is a flow chart of a temperature increasing control performed in the system according to the first embodiment.

Next, the temperature increasing control performed in the control unit 15 will be described in detail with reference to FIG. 3. FIG. 3 is a flow chart of the temperature increasing control according to the first embodiment. As shown in FIG. 3, the unit 15 receives the battery voltage Vb from a voltage detecting unit (not shown), and judges whether or not the battery voltage Vb is equal to or higher than an engine starting voltage value Vd (step S100). This value Vd is set to be lower than the lower limit Vbd of the battery voltage Vb and is set such that the engine of the vehicle or car can be started while using electric power of the battery 11 set at a voltage of the value Vd. More specifically, the control unit 15 calculates a present level of remaining capacity (i.e., state of charge: SOC) in the battery 11 by using data of the battery voltage Vb, the battery current Ib and the like and sets the value Vd based on this calculated level of remaining capacity. The remaining capacity denotes the quantity of electric charge which is held in the battery 11 so as to be dischargeable. When the battery voltage Vb is lower than the value Vd (NO at step S100), the unit 15 judges that, because the battery voltage Vb lower than the value Vd is further decreased in the temperature increasing control, the vehicle or car using the electric power of the battery 11 cannot run at a desired speed. Therefore, the unit 15 performs a normal control without performing any temperature increasing control (step S114). In this normal control, the converting unit 12 converts the battery voltage Vb to a boosted voltage higher than the voltage Vb to drive the motor 30 by converting this boosted voltage to the driving voltage Vm in the inverter 20, or electric power regenerated from the braking energy of the consumer 30 is supplied to the battery 11 through the inverter 20 and the converting unit 12.

Therefore, when the level of remaining capacity in the battery 11 is low, the electric power of the battery 11 is not consumed in the temperature increasing control, but the battery 11 is charged in the normal operation. Accordingly, the system 10 can prevent the battery 11 from being over-discharged, and the vehicle or car can reliably start running or run at a desired speed.

In contrast, when the battery voltage Vb is equal to or higher than the value Vd (YES at step S100), the unit 15 receives data of the battery temperature Tb detected by the detector 16 (step S101). Then, the unit 15 judges whether or not the temperature Tb is lower than the reference value Tth (step S102). When the temperature Tb is equal to or higher than the value Tth (NO at step S102), it is not required to warm the battery 11. Therefore, the unit 15 performs the normal control (step S114). In contrast, when the temperature Tb is lower than the value Tth (YES at step S102), the unit 15 alternately performs the voltage increasing operation (step S103 to step S106) and the voltage dropping operation (step S107 to step S110) to warm the battery 11.

In the voltage increasing operation, the capacitor 13 is charged with electric power of the battery 11 (step S103). Therefore, the battery voltage Vb is dropped. Then, the unit 15 judges whether or not the battery voltage Vb is higher than the lower limit Tbd (step S104). When the battery voltage Vb is higher than the lower limit Tbd (YES at step S104), the unit 15 judges whether or not the capacitor voltage Vc increasing in this voltage increasing operation is lower than a capacitor upper limit Vcu (step S105). This upper limit Vcu is, for example, equal to the withstand or breakdown voltage of the capacitor 13. When the capacitor voltage Vc is lower than the upper limit Vcu (YES at step S105), the unit 15 judges whether or not a predetermined period of time has elapsed after a start of the transfer of the electric power from the battery 11 to the capacitor 13 in this voltage increasing operation (step S106). Assuming that this voltage increasing operation is continued for the predetermined period of time, the remaining electric capacity of the capacitor 13 becomes insufficient to receive more electric power in the capacitor, and the level of the current flowing through the battery 11 is reduced.

Therefore, the calorific power Q generated in the battery 11 is reduced, and the battery 11 cannot be efficiently warmed. When the predetermined period has not yet elapsed after a start of this voltage increasing operation (NO at step S106), the procedure returns to step S103, and the voltage increasing operation is again performed.

In contrast, when the unit 15 receives data of the battery voltage Vb reaching the lower limit Tbd (NO at step S104), the unit 15 finishes this voltage increasing operation and performs the voltage dropping operation. Therefore, because the control unit 15 monitors the battery voltage Vb, the unit 15 can prevent the battery 11 from over-discharging the electric power. Further, when the unit 15 receives data of the capacitor voltage Vc increased to the upper limit Vcu (NO at step S105), the unit 15 finishes this voltage increasing operation and performs the voltage dropping operation. Therefore, because the control unit 15 monitors the capacitor voltage Vc, the unit 15 can prevent the capacitor voltage Vc from exceeding the withstand voltage and can prevent the capacitor 13 from being broken or damaged. Moreover, when the predetermined period has elapsed after a start of this voltage increasing operation before both the increase of the battery voltage Vb to the upper limit Tbu and the dropping of the capacitor voltage Vc to the lower limit Vcd (YES at step S106), the unit 15 finishes this voltage increasing operation and performs the voltage dropping operation. Therefore, because the control unit 15 measures the elapsing time of this voltage increasing operation, the unit 15 can prevent the capacitor from being saturated so as to reduce the calorific power Q generated in the battery 11.

In the voltage dropping operation, the capacitor voltage Vc is dropped, and the battery 11 is charged with the electric power of the capacitor 13 (step S107). Then, the unit 15 judges whether or not the battery voltage Vb is lower than the upper limit Tbu (step S108). When the battery voltage Vb is lower than the upper limit Tbu (YES at step S108), the unit 15 judges whether or not the capacitor voltage Vc is higher than a capacitor lower limit Vcd (step S109). When the capacitor voltage Vc is higher than the lower limit Vcd (YES at step S109) the unit 15 judges whether or not a predetermined period of time has elapsed after a start of the transfer of the electric power from the capacitor 13 to the battery 11 in this voltage dropping operation (step S110). Assuming that the voltage dropping operation is continued for the predetermined period, the level of the current flowing through the battery 11 is reduced, the calorific power Q generated in the battery 11 is reduced, and the battery 11 cannot be efficiently warmed. When the predetermined period of time has not yet elapsed after a start of this voltage dropping operation (NO at step S110), the procedure returns to step S107, and the voltage dropping operation is again performed.

In contrast, when the unit 15 receives data of the battery voltage Vb increased to the upper limit Tbu (NO at step S108) or data of the capacitor voltage Vc dropped to the lower limit Vcd (NO at step S109), the unit finished this voltage dropping operation. Further, when the predetermined period of time has elapsed after a start of this voltage dropping operation before both the battery voltage Vb increased to the upper limit Tbu and the capacitor voltage Vc dropped to the lower limit Vcd. (YES at step S110), the unit finishes this voltage dropping operation.

Then, in the same manner as the judgment at step S100, the unit 15 judges whether or not the battery voltage Vb is equal to or higher than the value Vd (step S111). When the battery voltage Vb is lower than the value Vd (NO at step S111), the unit 15 performs the normal control (step S114). Therefore, the system 10 can prevent the battery 11 from being over-discharged, and the vehicle or car can reliably start running or run at a desired speed. In contrast, when the battery voltage Vb is increased to the value Vd (YES at step S111), the unit 15 receives data of the battery temperature Tb in the same manner as the operation at step S101 (step S112). When the temperature Tb is lower than the value Tth (NO at step S113), it is required to further warm the battery 11. Therefore, the procedure returns to step S103, and the system 10 again performs the voltage increasing operation (steps S103 to S106) and the voltage dropping operation (steps S107 to S110). In contrast, when the temperature Tb is equal to or higher than the value Tth (YES at step S113), the battery 11 is sufficiently warmed to start the running of the vehicle or car or to run the vehicle or car at a desired speed. Therefore, the unit 15 performs the normal control (step S114).

Therefore, when the battery voltage Vb is increased to the upper limit Tbu, the control unit 15 controls the converting unit 12 to supply electric power of the battery 11 to the capacitor 13. Further, when the capacitor voltage Vc is reduced to the lower limit Vcd, the control unit 15 controls the converting unit 12 to supply electric power of the battery 11 to the capacitor 13. Accordingly, because the control unit 15 monitors the battery voltage Vb and the capacitor voltage Vc, the unit 15 can judge whether or not the voltage dropping operation of the system 10 should be transferred to the normal operation or the voltage increasing operation. That is, the system 10 can prevent the battery 11 from being overcharged. Moreover, the system 10 can prevent the capacitor 13 from being saturated so as to reduce the calorific power Q generated in the battery 11.

As described above, in this embodiment, the control unit 15 substantially controls the converting unit 12 to change the transfer direction of the electric power between the battery 11 and the capacitor 13 each time the battery voltage reaches one of the limits Vbu and Vbd. More specifically, each time the battery voltage reaches the upper limit Vbu, the converting unit 12 changes the transfer of the electric power from the capacitor 13 to the battery 11 to the other transfer of the electric power from the battery 21 to the capacitor 13. Further, each time the battery voltage reaches the lower limit Vbd, the converting unit 12 changes the transfer of the electric power from the battery 11 to the capacitor 13 to the other transfer of the electric power from the capacitor 13 to the battery 11. Therefore, the control unit 15 can control the converting unit 12 to change the battery voltage Vb within the range from the upper limit Vbu to the lower limit Vbd. Accordingly, the system 10 can prevent the battery 11 from being overcharged or over-discharged, the system 10 can prevent the battery 11 from being damaged or broken, and the system 10 can cause a temperature rise in the battery 11 while assuring the safety of the battery 11.

Further, the control unit 15 controls the converting unit 12 such that the capacitor voltage Vc is changed within the range from the upper limit Vcu to the lower limit Vcd. Accordingly, the system 10 can further reliably prevent the battery 11 from being damaged or broken, and the system 10 can cause a temperature rise in the battery 11 while further reliably assuring the safety of the battery 11.

Moreover, the system 10 alternately performs the voltage increasing operation and the voltage dropping operation to transfer electric power between the battery 11 and the capacitor 13 and to generate heat in the battery 11. Accordingly, the system 10 can rapidly cause a temperature rise in the battery 11. Further, when each of the voltage increasing operation and the voltage dropping operation is continued for the predetermined period, this operation is stopped to prevent the capacitor 13 from being saturated. Accordingly, the system 10 can further rapidly cause a temperature rise in the battery 11.

In conclusion, the system 10 can rapidly cause a temperature rise in the battery 11 while assuring the safety of the battery 11.

Second Embodiment

In this embodiment, each pair of one voltage increasing operation and one voltage dropping operation performed in the temperature increasing control, while the system 10 prevents the battery voltage Vb from being exceeding the upper limit Vbu and being lower than the lower limit Vbd, is defined as one cycle, and the number of cycles per second in this control is called a frequency of the voltage increasing and dropping operations alternately performed in the electric power transfer between the battery 11 and the capacitor 13. The relation between the frequency and the calorific power Q ($=(Ib)^2 \times R$) generated in the battery 11 is examined in advance for each of reference levels of battery temperature Tb while the battery voltage Vb is changed within the voltage range from the upper limit Vbu to the lower limit Vbd. Data of this relation are stored in advance in a storage of the control unit 15. Then, the unit 15 determines an optimum frequency at which the calorific power Q generated at the detected battery temperature Tb is maximized, and controls the converting unit 12 to alternately perform the voltage increasing and dropping operations at the optimum frequency. The structure of an electric current consumer driving apparatus according to the second embodiment is substantially the same as the structure of the apparatus shown in FIG. 1.

Figure 4:
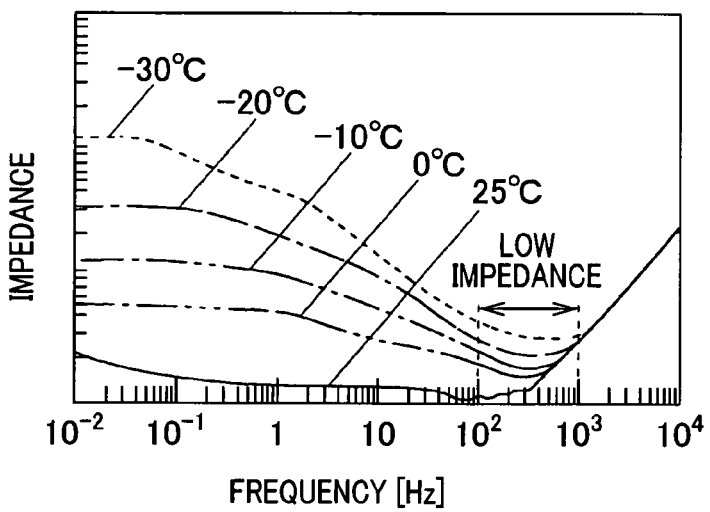
FIG. 4 is a view showing the relation between frequency and impedance of a battery according to the second embodiment of the present invention.
Figure 5:
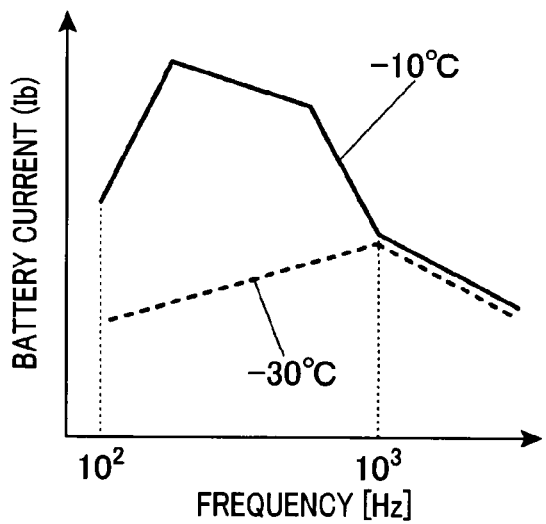
FIG. 5 is a view showing the relation between frequency and battery current according to the second embodiment.
Figure 6:
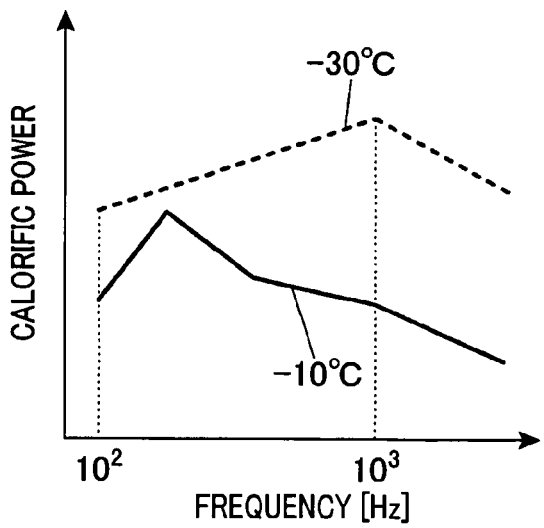
FIG. 6 is a view showing the relation between frequency and calorific power according to the second embodiment.

The relation between the frequency and the calorific power Q will be described with reference to FIG. 4 to FIG. 6. FIG. 4 is a view showing the relation between the frequency and the impedance of the battery 11 for each of reference levels of battery temperature Tb, FIG. 5 is a view showing the relation between the frequency and the battery current Tb, capable of flowing through the battery 11, for each of reference levels of battery temperatures Tb, and FIG. 6 is a view showing the relation between the frequency and the calorific power Q for each of reference levels of battery temperatures Tb.

The direct-current resistance of the battery 11 at a low temperature is extremely high. When direct electric current flows through the battery 11 cooled at the low temperature, the battery voltage Vb soon reaches the upper and lower limits Vbu and Vbd. For example, the upper limit Vbu of each battery cell is approximately 4.2V, while the lower limit Vbd of each battery cell is approximately 2.5V. When the battery voltage Vb is placed out of the voltage range between the limits Vbu and Vbd, the battery 11 easily deteriorates. Therefore, a large direct current easily placing the battery voltage Vb out of the voltage range should not flow through the battery 11. In contrast, even when the battery 11 is at the low temperature, the alternating-current resistance (i.e., impedance) of the battery 11 is low in a specific frequency range. Therefore, even when the voltage increasing operation and the voltage dropping operation are alternately performed in this range to make a large alternating current flow through the battery 11, the battery voltage Vb hardly reaches the upper or lower limit Vbu or Vbd. Because the calorific power Q is proportional to the battery current Ib squared, a large alternating current should be given to the battery 11 to increase the calorific power Q. Therefore, the relation between the impedance of the battery 11 and the frequency is measured in advance for each of reference levels of battery temperature Tb, and the voltage increasing and dropping operations should be alternately performed in a specific frequency range in which the impedance of the battery 11 is low.

More specifically, as shown in FIG. 4, although the impedance of the battery 11 depends on the battery temperature Tb, the impedance is low in a specific frequency range from 100 Hz to 1000 Hz for any battery temperature Tb. Therefore, it is preferable to alternately perform the voltage increasing and dropping operations in this specific frequency range.

Further, because the impedance of the battery 11 depends on the battery temperature Tb, the battery current Ib capable of flowing through the battery 11, in which the battery voltage Vb is changed within the voltage range from the upper limit Vbu to the lower limit Vbd, depends on the battery temperature Tb. For example, the impedance of the battery 11 at a very low temperature equal to or lower than −30 degrees Celsius is high as compared with the impedance at the temperature of −10 degrees Celsius, the voltage Vb of the battery 11 at the very low temperature easily reaches the upper and lower limits Vbu and Vbd in the frequency range not higher than 1000 Hz. Therefore, as shown in FIG. 5, when the temperature increasing control is performed while preventing the battery voltage Vb from reaching the upper or lower limit Vbu or Vbd, the electric current capable of flowing through the battery 11 at the very low temperature is low and constantly decreased in the frequency range not higher than 1000 Hz.

In contrast, as shown in FIG. 4, the impedance of the battery 11 is comparatively low at a low temperature such as −10 degrees Celsius in the specific frequency range from 100 Hz to 1000 Hz. Therefore, the battery voltage Vb does not reach the upper or lower limit Vbu or Vbd even at the frequency being equal to or lower than 1000 Hz. Therefore, as shown in FIG. 5, when the temperature increasing control is performed at the frequency set at a value equal to or lower than 1000 Hz while preventing the battery voltage Vb from reaching the upper or lower limit Vbu or Vbd, a comparatively high level of electric current can flow through the battery 11 being at the temperature of −10 degrees Celsius.

Further, as shown in FIG. 5, a specific frequency, at which the battery current Ib capable of flowing through the battery 11 is maximized, depends on the battery temperature Tb and is placed in the specific frequency range in the temperature range not lower than −10 degrees Celsius. More specifically, when the temperature increasing control is performed, while preventing the battery voltage Vb from reaching the upper or lower limit Vbu or Vbd, a period dt of time for one cycle is lengthened as the frequency is decreased from a high frequency of 1000 Hz, and the battery current Ib capable of flowing through the battery 11 is increased (di=V/L×dt, di denotes the quantity of charge flowing through the battery 11 for one cycle). However, as the frequency is decreased, the capacity of the capacitor 13 is decreased so as to easily saturate the capacitor 13, and a quantity of charge capable of being accumulated in the capacitor 13 is decreased. Therefore, an electric current capable of flowing through the battery 11 is maximized at a specific frequency in the specific frequency range. For example, when the battery temperature Tb is, for example, equal to −10 degrees Celsius, the battery current Lb capable of flowing through the battery 11 is maximized at the frequency of approximately 200 Hz. The control unit 15 can arbitrarily change the battery current Ib flowing through the battery 11 by adjusting the duty of the driving signal given to the switching element 12b and the duty of the driving signal given to the switching element 12c.

As shown in FIG. 6, because the calorific power Q is determined from both the battery current Ib and the internal resistance R (i.e., impedance) of the battery 11 ($Q=(Ib)^2 \times R$), the calorific power Q depends on the battery temperature Tb and the frequency. To rapidly cause a rise of the battery temperature Tb, the voltage increasing and dropping operations should be performed at an optimum frequency at which the calorific power Q is maximized. Therefore, in this embodiment, the optimum frequency and the duty, corresponding to the battery current Ib capable of flowing through the battery 11 at the optimum frequency (see FIG. 5), are examined and mapped for each reference level of battery temperature Tb. The control unit 15 stores these maps in advance.

Further, when the level of remaining capacity (hereinafter, called SOC) to be dischargeable from the battery 11 is high, the battery voltage Vb easily exceeds the upper limit Vbu. In contrast, when the SOC is low, the battery voltage Vb easily becomes lower than the lower limit Vbd. Therefore, the relation between the frequency and the calorific power Q (see FIG. 6) is prepared for each of reference levels of SOC, the map of the optimum frequency and a revised duty is prepared for each level of SOC, and the control unit 15 stores this relation and the map for each level of SOC in advance. In the preparation of the map, the revised duty is set to be lower than the non-revised duty corresponding to the optimum frequency in the low SOC region and the high SOC region. In the other SOC region, the revised duty is equal to the non-revised duty corresponding to the optimum frequency. The relations shown in FIG. 5 and FIG. 6 correspond to the SOC level of 60%. Further, data for preparing the relations shown in FIG. 5 and FIG. 6 depend on characteristics of materials of the positive and negative electrodes of the lithium-ion rechargeable battery. Therefore, the relations shown in FIG. 5 and FIG. 6 are prepared for each lithium-ion rechargeable battery.

Figure 7:
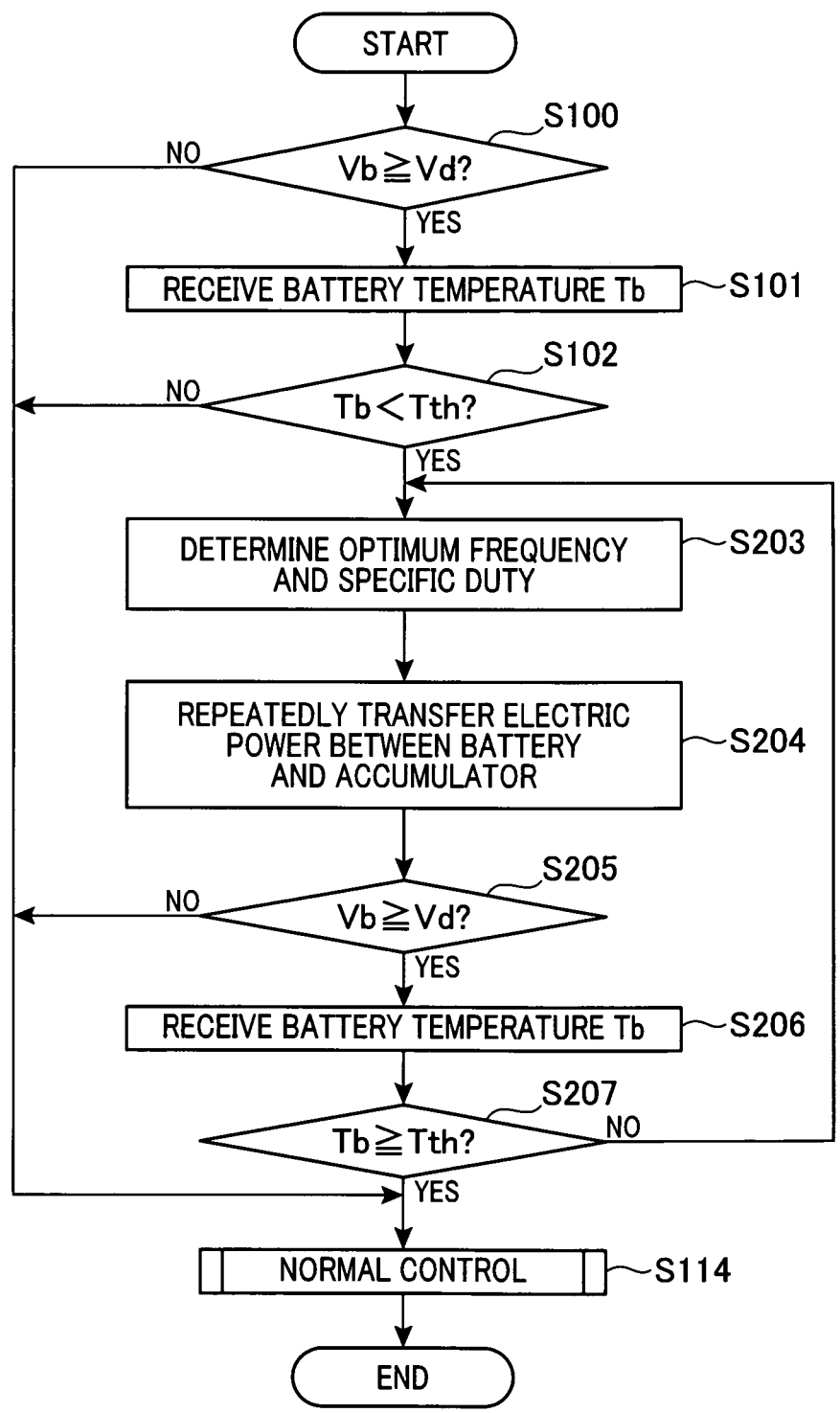
FIG. 7 is a flow chart of a temperature increasing control performed in the system according to the second embodiment.

Next, a temperature increasing control performed in the control unit 20 to cause a rise of the battery temperature Tb will be described with reference to FIG. 7. FIG. 7 is a flow chart of a temperature increasing control according to the second embodiment.

As shown in FIG. 7, the process at step S100 to step S102 is performed in the same manner as in the first embodiment. When the battery temperature Tb is lower than the reference value Tth (YES at step S202), the control unit 15 determines an optimum frequency, at which the calorific power Q corresponding to the battery temperature Tb detected by the detector 16 is maximized, and a specific duty, corresponding to the battery current Ib capable of flowing through the battery 11 at the optimum frequency, from the map corresponding to the battery temperature Tb and the present SOC level (step S203). The control unit 15 always calculates the SOC level by using data of the battery voltage Vb and data of the battery current Ib, so that the unit 15 can select the map corresponding to the detected battery temperature Tb and the present SOC level and can determine the optimum frequency and the specific duty in the selected map.

Then, the driving signals sent to the switching elements 12b and 12c are set at the specific duty together, and the switching elements 12b and 12c are driven according to the driving signals set at the specific duty to repeatedly transfer electric power between the battery 11 and the capacitor 13 while alternately performing the voltage increasing and dropping operations at the optimum frequency and to warm the battery 11 (step S204). During this switching operation of the elements 12b and 12c, electric energy is lost in the reactive element 12a, the elements 12b and 12c and the diodes 12d and 12e. Therefore, the SOC level of the battery 11 is gradually decreased, and the battery voltage Vb is gradually decreased.

Then, when the battery voltage Vb is lower than the predetermined value Vd (NO at step S205), the unit 15 stops this temperature increasing control to keep the running of the vehicle at a desired speed, and the unit 15 performs the normal control (step S114). In contrast, when the battery voltage Vb is equal to or higher than the predetermined value Vd (YES at step S205), the unit 15 receives data of the battery temperature Tb increased in this temperature increasing control while continuing the voltage increasing and dropping operations (step S206). This reception may be performed every pair of voltage increasing and dropping operations or may be performed each time the voltage increasing and dropping operations are alternately performed for a predetermined period of time.

Then, the unit 15 judges whether or not the detected battery temperature Tb is equal to or higher than the reference value Tth (step S207). When the battery temperature Tb does not reach the reference value Tth (NO at step S207), the procedure returns to step S203, and this temperature increasing control is continued. In contrast, when the battery temperature Tb has reached the reference value Tth (YES at step S207), the unit 15 performs the normal control (step S114).

As described above, in this embodiment, on condition that the temperature increasing control is performed while preventing the battery voltage Vb from reaching the upper or lower limit Vbu or Vbd, the optimum frequency, at which the calorific power Q is maximized, and the specific duty, corresponding to the battery current Ib capable of flowing through the battery 11 at the optimum frequency, are determined according to the battery temperature Tb and the SOC level of the battery 11, and the control unit 15 controls the converting unit 12 to perform the switching operation in the switching elements 12b and 12c at the optimum frequency in the voltage increasing and dropping operations according to the driving signals set at the specific duty. Therefore, when electric power is repeatedly transferred between the battery 11 and the capacitor 13, the system 10 can prevent the battery 11 from being overcharged or over-discharged. Accordingly, the system 10 can reliably prevent the battery 11 from being damaged or broken and can cause a temperature rise in the battery 11 while assuring the safety of the battery 11.

Further, in this embodiment, electric power is transferred between the battery 11 and the capacitor 13 at the optimum frequency at which the calorific power Q is maximized. Accordingly, the system 10 can rapidly cause a temperature rise in the battery 11. In addition, the optimum frequency is determined based on not only the battery temperature Tb but also the SOC level of the battery 11. Accordingly, the system 10 can further rapidly cause a temperature rise in the battery 11.

Moreover, as the battery temperature Tb is increased, the value of the optimum frequency and the value of the specific duty are renewed. Accordingly, the system 10 can warm the battery 11 while always giving the maximum calorific power Q to the battery 11 regardless of a change in the battery temperature Tb. In other words, the optimum frequency and the specific duty are changeable with the battery temperature Tb. To changeably determine the optimum frequency and the specific duty, the optimum frequency and, the specific duty are changed (step S203 shown in FIG. 7) each time the changed battery temperature Tb is detected (step S206). Then, electric power is transferred between the battery 11 and the capacitor 13 at the changed optimum frequency and the changed specific duty (step S204).

In this embodiment, the unit 15 stores in advance the relation between the frequency and the duty for each level of battery current Ib and determines the optimum frequency and the specific duty. However, the unit 15 may store in advance data indicating the relation between the frequency and the calorific power Q for each level of the battery temperature Tb, on condition that the battery voltage Vb is lower than the upper limit Vbu and is higher than the lower limit Vbd, to determine the optimum frequency.

Figure 8:
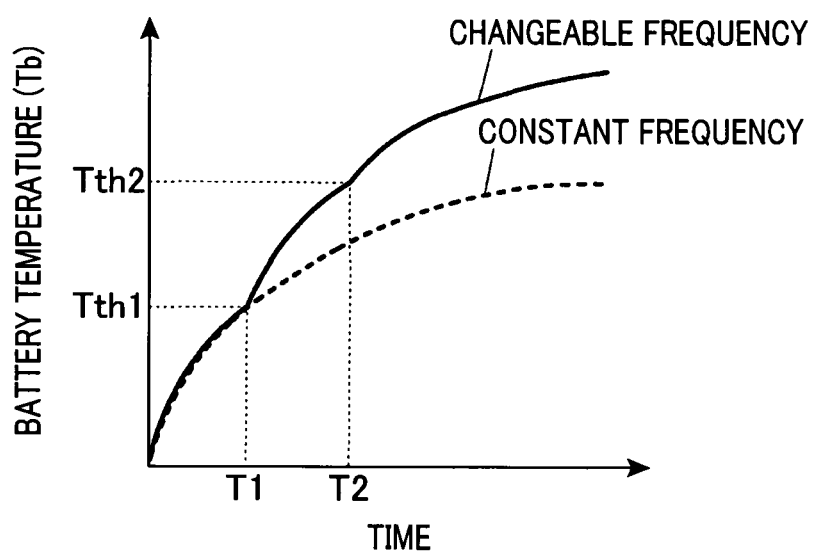
FIG. 8 is a view showing a change in a battery temperature in each of a constant optimum frequency and a changeable optimum frequency according to the second embodiment.

FIG. 8 is a view showing a change in the battery temperature Tb with time in each of the constant optimum frequency and the changeable optimum frequency. As shown in FIG. 8, when the value of the optimum frequency is changed at a first time T1, the battery temperature Tb of the value Tth1 at the time T1 is increased to the value Tth2 at a second time T2. In contrast, when the value of the optimum frequency is not changed at the time T1, the value of the battery temperature Tb at the time T2 is lower than the value Tth2. Therefore, when the value of the optimum frequency is changeably determined, the calorific power Q generated in the battery 11 can be always maximized regardless of a change in the battery temperature Tb.

Accordingly, because the value of the optimum frequency is changeably determined such that the calorific power Q generated in the battery 11, of which the battery temperature Tb is changed with time, is always maximized, the battery temperature Tb can be rapidly increased, as compared with the case where the value of the optimum frequency is not changed. The optimum frequency may be changed every constant period of time, or may be changed each time the battery temperature Tb is changed by a predetermined value.

In the first and second embodiments, the judgment at step S100 shown in FIG. 3 and FIG. 7 is not necessary. Further, when the battery voltage Vb and the capacitor voltage Vc are always monitored, the voltage increasing and dropping operations alternately performed may be continued, regardless of the judgment at step S106 and step S110, until at least one of the voltages Vb and Vc reaches one limit Vbd, Vcu, Vbu or Vcd. Therefore, in this case, the judgment at step S106 and step S110 is not necessary.

Further, in the first embodiment, the battery voltage Vb, the capacitor voltage Vc and the battery temperature Tb are monitored every predetermined period of time (steps S104, S105, S108, S109 and S113) to alternately perform the voltage increasing and dropping operations. However, the control unit 16 may receive the reactor current IL flowing through the converting unit 12 to change the voltage increasing operation to the voltage dropping operation, when the current IL flowing in the positive direction reaches an upper limit, and to change the voltage dropping operation to the voltage increasing operation when the current IL flowing in the negative direction reaches the upper limit. In this case, the system 10 can prevent the converting unit 12 from being damaged or broken due to an overcurrent flowing through the converting unit 12.

Moreover, in the second embodiment, the control unit 15 stores in advance the relation (see FIG. 6) between the frequency in the transfer of electric power and the calorific power Q generated in the battery 11 for each reference level of battery temperature Tb so as to prevent the battery voltage Vb from being out of the voltage range from the upper limit Vbu to the lower limit Vbd. However, the control unit 15 may store in advance the relation (see FIG. 5) between the frequency and the battery current Ib in place of the relation between the frequency and the calorific power Q. That is, the control unit 15 may store in advance the relation between the frequency and the battery current Ib for each reference level of battery temperature Tb so as to prevent the battery voltage Vb from being out of the voltage range. In this case, the unit 15 determines the optimum frequency from the relation between the frequency and the battery current Ib associated with the battery temperature Tb to alternately perform the voltage increasing and dropping operations at the optimum frequency.

Furthermore, in the second embodiment, the relation between the frequency and the calorific power Q is mapped for each reference level of battery temperature Tb and for each SOC level and is stored in advance in the control unit 15. However, the relation between the frequency and the calorific power Q may be mapped for each reference level of battery temperature Tb without considering the SOC. In the same manner, the relation between the frequency and the battery current Ib may be mapped for each reference level of battery temperature Tb without considering the SOC.

Third Embodiment

Figure 9:
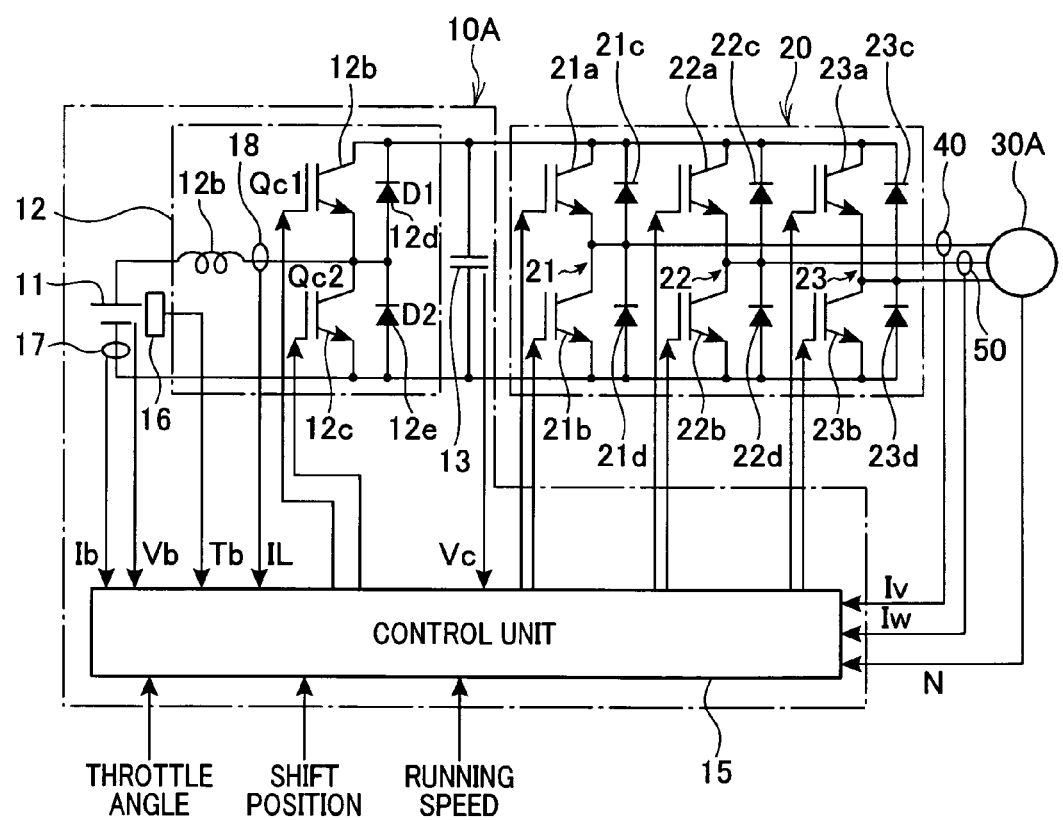
FIG. 9 is a structure view of an electric current consumer driving apparatus with a battery temperature rise causing system according to the third embodiment of the present invention.

FIG. 9 is a structure view of an electric current consumer driving apparatus with a battery temperature rise causing system according to the third embodiment. As shown in FIG. 9, an electric current consumer driving apparatus has a battery temperature rise causing system 10A, the inverter 20, an electric motor (or a motor generator) 30A, a v-phase current detector 40 for detecting a v-phase current Iv supplied to the motor 30A, and a w-phase current detector 50 for detecting a w-phase current Iw supplied to the motor 30A. The system 10A differs from the system 10 shown in FIG. 1 in that no driving circuit is disposed in the system 10A.

The motor 30A is, for example, a three-phase permanent-magnetic synchronous motor having a u-phase coil, a v-phase coil and a w-phase coil. Ends of these three coils are connected with one another at a central point in a Y shape. The other end of the u-phase coil is connected with the emitter of the element 21a and the collector of the element 21b. The other end of the v-phase coil is connected with the emitter of the element 22a and the collector of the element 22b. The other end of the w-phase coil is connected with the emitter of the element 23a and the collector of the element 23b.

When the control unit 15 performs a switching control for the switching elements 21a, 21b, 22a, 22b, 23a and 23b of the inverter 20 to control an electric current flowing through each coil of the motor 30A, the motor 30A generates an instructed driving torque to drive wheels of a hybrid vehicle or an electric car.

The motor 30A may be connected with an engine of the vehicle or car so as to have a generator function and an electric motor function. As the generator function, the motor 30A generates electric power from a rotational power generated in the engine. As the electric motor function, the motor 30A supplies electric power, required to start the engine, to the engine. Further, the motor 30A performs a power consuming operation or a power regeneration operation according to running conditions of the vehicle or car. In the power consuming operation, the motor 30A is driven while consuming the electric power accumulated in the capacitor 13 and converted in the inverter 20. In the power regeneration operation, when a braking operation is performed for the vehicle, the motor 30A regenerates electric power from the running energy of the vehicle, and this regenerated electric power is supplied to the capacitor 13 or the battery 11.

The control unit 15 of the system 10A receives data indicating a throttle angle (or data indicating an acceleration stroke position), data indicating a shift position of a transmission, and data indicating a vehicle or car running speed. The control unit 15 determines a driving torque of the motor 30A, required to drive the vehicle or car, from the received data. The control unit 15 receives data indicating a motor speed (i.e., the number of revolutions) N of the motor 30A, produces driving signals from the determined torque and speed and directly outputs these driving signals to the switching elements 12b and 12c of the converting unit 12 and the switching elements 21a, 21b, 22a, 22b, 23a and 23b of the inverter 20. Therefore, the motor 30A is driven under control of the control unit 15. The unit 15 may directly receive the data of the throttle angle, the shift position and the running speed from sensors or may receive these data from an external unit such as an engine electronic control unit (ECU).

Further, the control unit 15 receives data indicating the v-phase current Iv flowing through the v-phase coil of the motor 30A, data indicating the w-phase current Iw flowing through the w-phase coil of the motor 30A from the detectors 40 and 50. The control unit 15 determines a u-phase current Iu flowing through the u-phase coil of the motor 30A from the data of the currents Iv and Iw, and determines a driving voltage Vm of the motor 30A, required for the running of the motor 30A, from the data of the currents Iu, Iv and Iw and the received data.

Further, the control unit 15 has a function for causing a rise of the temperature Tb in the battery 11. More specifically, a reference temperature value Tth is preset to be lower than a freezing point (i.e., zero degree Celsius) and equal to or higher than −30 degrees Celsius. When the battery temperature Tb is lower than the reference value Tth, characteristics of the battery 11 in the charging and discharging of electric power deteriorate. The value Tth can be appropriately set according to characteristics of the battery cells composing the battery 11.

When the battery temperature Tb is equal to or higher than the value Tth, it is not required to warm the battery 11.

Therefore, the control unit 15 controls the converting unit 12 and the inverter 20 to perform a normal control. In contrast, when the battery temperature Tb is lower than the value Tth, the control unit 15 performs a temperature increasing control to control the converting unit 12 according to the driving voltage Vm, the capacitor voltage Vc and the battery voltage Vb, and the converting unit 12 causes a rise of the battery temperature Tb while alternately performing a transfer of the electric power from the capacitor 13 to the battery 11 and a transfer of the electric power from the battery 11 to the capacitor 13 in the electric power transfer between the battery 11 and the capacitor 13. During the electric power transfer, an electric current flows through the battery 11, and the battery 11 is warmed.

Further, in this temperature increasing control, the control unit 15 controls the converting unit 12 while preventing the capacitor voltage Vc from exceeding a capacitor upper limit Vcu, preventing the capacitor voltage Vc from falling below the driving voltage Vm, preventing the battery voltage Vb from exceeding a battery upper limit Vbu and preventing the battery voltage Vb from falling below a battery lower limit Vbd. In other words, the control unit 15 controls the electric power transfer between the battery 11 and the capacitor 13 while placing the capacitor voltage Vc in the range from the upper limit Vcu to the driving voltage Vm and placing the battery voltage Vb in the range from the upper limit Vbu to the lower limit Vbd. Therefore, the system 10A can reliably apply the voltage, required for the running of the motor 30A, to the motor 30A and can prevent the battery 11 from being overcharged or over-discharged.

Then, when the battery temperature Tb is increased to the value Tth, the control unit 15 controls the converting unit 12 and the inverter 20 to normally drive the motor 30A according to signals sent from the unit 15. In this normal control, the combination of the unit 12 and the inverter 20 alternately performs a voltage increasing operation and a voltage dropping operation. In the voltage increasing operation, electric power of the battery 11 is transferred to the capacitor 13 to increase the capacitor voltage Vc. In the voltage dropping operation, electric power of the capacitor 13 is returned to the battery 11 to drop the capacitor voltage Vc.

In response to signals sent from the control unit 15, the inverter 20 converts the dc capacitor voltage Vc equal to or higher than the driving voltage Vm into an ac voltage and applies this ac voltage to the motor 30A to drive the motor 30A. Further, the inverter 20 can convert an ac voltage generated in the motor 30A into a dc voltage to supply electric power of this dc voltage to the battery 11 through the capacitor 13 and the converting unit 12.

The control unit 15 performs a switching control for the inverter 20 to control an electric current flowing through each coil of the motor 30A, and the motor 30A generates an instructed driving torque to drive wheels of a hybrid vehicle or an electric car. The motor 30A may be connected with an engine of the vehicle or car to generate electric power from a rotational power generated in the engine as a generator function and to supply electric power, required to start the engine, to the engine as an electric motor function. That is, when the vehicle is accelerated, the motor 30A performs the rotation operation while generating the driving torque of the vehicle or car from electric power of the capacitor 13 having a voltage equal to or higher than the driving voltage Vm. In contrast, when the vehicle is decelerated, the motor 30A performs the power regeneration operation to supply electric power, obtained from the kinetic energy of the vehicle or car, to the capacitor 13.

Figure 10:
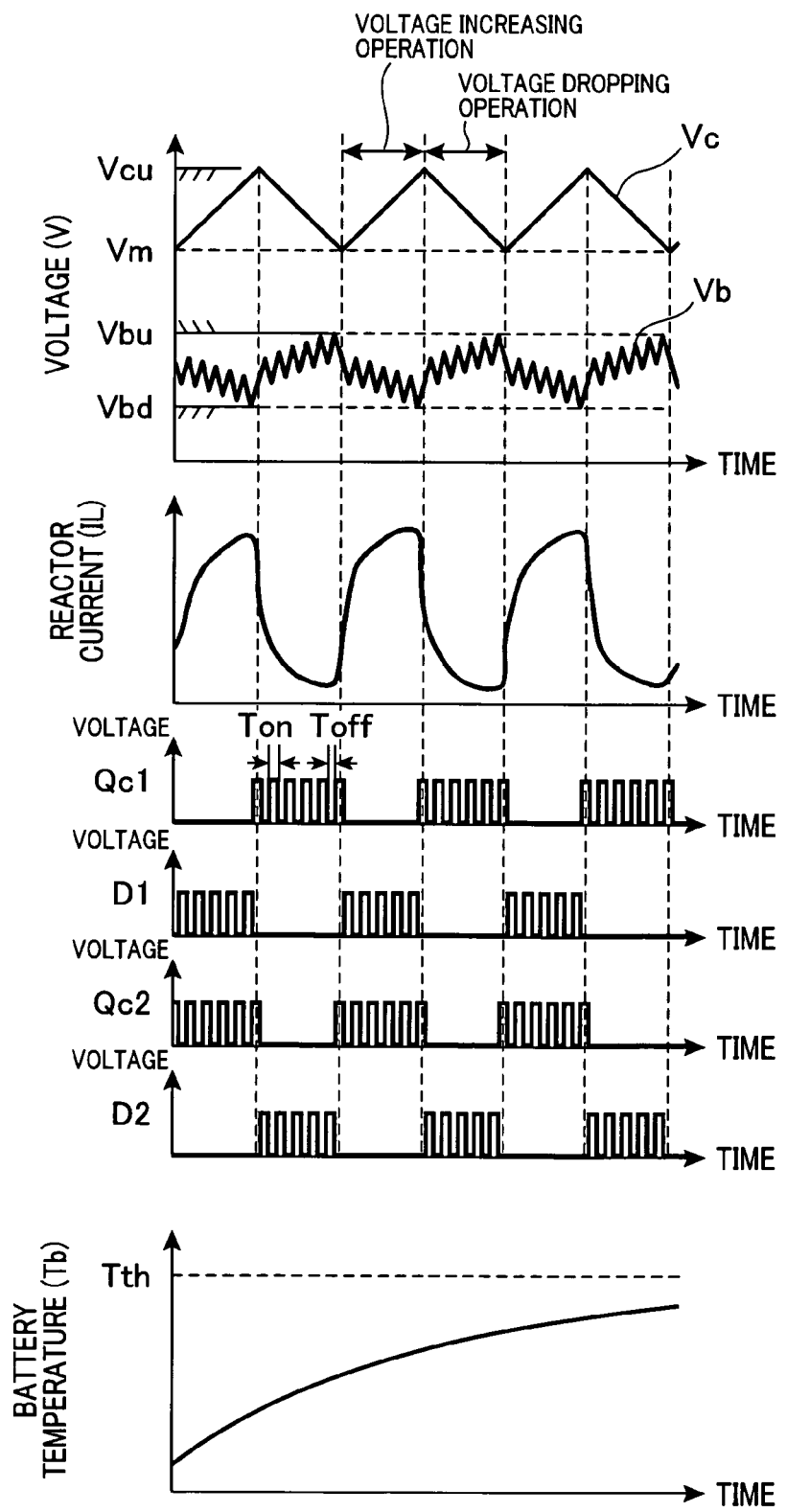
FIG. 10 is a timing chart of voltage, current and temperature in the system shown in FIG. 9.

Next, an operation of the battery temperature rise causing system 10 is now described below with reference to FIG. 9 and FIG. 10. FIG. 10 is a timing chart of the capacitor voltage Vc, the battery voltage Vb, the reactor current IL, currents flowing through the elements and diodes, and the battery temperature Tb in the system 10A. In the system 10A, the control unit 15 outputs driving signals to the respective switching elements of the unit 12 and the inverter 20, and each switching element is turned on or off in response to the corresponding driving signal of the circuit 14.

In the voltage increasing operation for increasing the capacitor voltage Vc, the capacitor 13 is charged with electric power of the boost voltage higher than the battery voltage Vb under the direct control of the control unit 15 in the same manner as in the first embodiment, and the battery voltage Vb is decreased. When the battery voltage Vb is dropped to the lower limit Vbd, this voltage increasing operation is stopped. Further, when the capacitor voltage Vc is increased to a capacitor upper limit Vcu, this voltage increasing operation is stopped.

In the voltage dropping operation for dropping the capacitor voltage Vc, the battery 11 is charged with electric power of the dropped voltage in the same manner as in the first embodiment, and the battery voltage Vb is increased while the capacitor voltage Vc is decreased. When the battery voltage Vb is increased to the upper limit Vbu, this voltage dropping operation is stopped. Further, when the capacitor voltage Vc is decreased to the value of the driving voltage Vm, this voltage dropping operation is stopped.

Because the driving voltage Vm is determined from the phase currents supplied to the motor 30A, the driving voltage Vm is changed with time.

Figure 11:
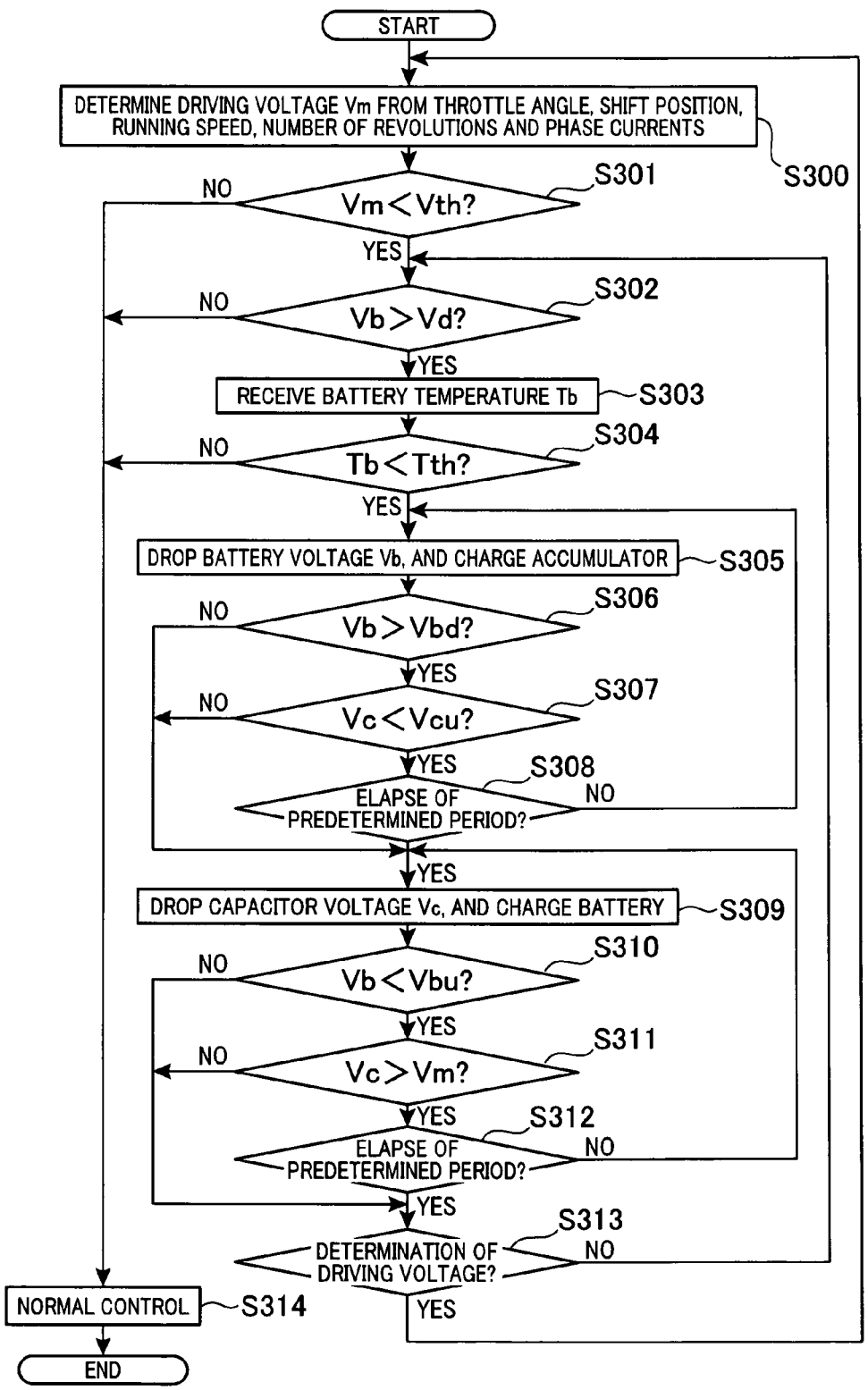
FIG. 11 is a flow chart of a temperature increasing control according to the third embodiment.

Next, the temperature increasing control performed in the control unit 15 will be described in detail with reference to FIG. 11. FIG. 11 is a flow chart of the temperature increasing control according to the third embodiment. As shown in FIG. 11, at step S300, the control unit 15 receives data indicating a throttle angle, data indicating a shift position of a transmission and data indicating a vehicle or car running speed from external sensors or an engine ECU, and the unit 15 receives phase-currents Iv and Iw and a motor speed N from the motor 30A. The unit 15 determines a driving torque of the motor 30A from the throttle angle, the shift position and the running speed, determines driving power required to drive the motor 30A from the driving torque and the motor speed determines a u-phase current Iu from the phase currents Iv and Iw, and determines the value of a driving voltage Vm of the motor 30A from the required power and the phase currents Iu, Iv and Iw. A voltage equal to or higher than the driving voltage Vm is necessary to run the vehicle or car at an instructed speed and to efficiently drive the motor 30A.

Then, at step S301, the unit 15 judges whether or not the driving voltage Vm is lower than a reference voltage value Vth. The driving voltage Vm applied to the motor 30A to drive the motor 30A at a desired speed is changeable and depends on running conditions of the vehicle or car. When the vehicle starts running or is now running at a high speed, the motor 30A sometimes requires the maximum (e.g., 650V) of the driving voltage Vm. This maximum value is set as the value (or a predetermined threshold value) Vth. Further, reliably apply the driving voltage Vm to the motor 30A during the temperature increasing control, the capacitor voltage Vc should be higher than the driving voltage Vm. In this situation, when the determined driving voltage Vm is substantially equal to the value Vth, the capacitor voltage Vc is increased to a high value higher than the value Vth during the temperature increasing control, and the capacitor 13 is sometimes damaged due to the high voltage of the electric power accumulated in the capacitor 13. Therefore, when the determined driving voltage Vm is not lower than the value Vth, the unit 15 should perform a normal control without performing any temperature increasing control to prevent the capacitor 13 from being damaged.

When the driving voltage Vm is equal to or higher than the value Vth (NO at step S301), the unit 15 performs a normal control without performing any temperature increasing control (step S314). In this normal control, the converting unit 12 converts the battery voltage Vb to a boosted voltage higher than the voltage Vb to drive the motor 30A by converting this boosted voltage to the driving voltage Vm in the inverter 20, or electric power regenerated from the braking energy of the motor 30A is supplied to the battery 11 through the inverter 20 and the converting unit 12. The value Vth may be preset at a value (e.g., 400V) of the driving voltage Vm at which an electric current can sufficiently flow through the battery 11.

In contrast, when the driving voltage Vm is lower than the value Vth (YES at step S301), the unit 15 judges that the unit 15 can perform a temperature increasing control while applying the driving voltage Vm, required to drive the vehicle or car, to the motor 30A. Therefore, the unit 15 receives the battery voltage Vb from a voltage detecting unit (not shown), and judges whether or not the battery voltage Vb is equal to or higher than a predetermined value Vd (step S302). This value Vd is set based on a level of remaining capacity (i.e., state of charge: SOC) in the battery 11, and this level of remaining capacity is calculated by using data of the battery voltage Vb and an electric current Ib flowing through the battery 11. The remaining capacity denotes the quantity of electric charge which is held in the battery 11 so as to be dischargeable. A value of the battery voltage Vb, at which the remaining capacity level is a half of the maximum of the remaining capacity, is preset as the level value Vd. When the battery voltage Vb is lower than the value Vd (NO at step S302), the unit 15 judges that, because the battery voltage Vb lower than the value Vd is further decreased in the temperature increasing control, the vehicle or car using the electric power of the battery 11 cannot run at a desired speed. Therefore, the unit 15 performs the normal control without performing any temperature increasing control (step S314).

In control, when the battery voltage Vb is equal to or higher than the value Vd (YES at step S302), the unit 15 receives data of the battery temperature Tb detected by the detector 16 (step S303). Then, the unit 15 judges whether or not the temperature Tb is lower than the reference value Tth (step S304). When the temperature Tb is lower than the value Tth (YES at step S304), the unit 15 alternately performs the voltage increasing operation (step S305 to step S308) and the voltage dropping operation (step S309 to step S312) to warm the battery 11.

In the voltage increasing operation, the capacitor 13 is charged with the electric power of the battery 11 (step S305). Therefore, the battery voltage Vb is dropped. Then, the unit 15 judges whether or not the battery voltage Vb is higher than the lower limit Tbd (step S306). When the battery voltage Vb is higher than the lower limit Tbd. (YES at step S306), the unit 15 judges whether or not the capacitor voltage Vc increasing in this voltage increasing operation is lower than a capacitor upper limit Vcu (step S307). This upper limit Vcu is, for example, equal to the withstand voltage of the capacitor 13. When the capacitor voltage Vc is lower than the upper limit Vcu ((ES at step S307), the unit 15 judges whether or not a predetermined period of time has elapsed after a start of the transfer of the electric power from the battery 11 to the capacitor 13 in this voltage increasing operation (step S308).

Assuming that this voltage increasing operation is continued for the predetermined period of time, the electric capacity of the capacitor 13 becomes insufficient to receive electric power in the capacitor, and the level of the current flowing through the battery 11 is reduced. Therefore, the calorific power generated in the battery 11 is reduced, and the battery 11 cannot be efficiently warmed. When the predetermined period has not yet elapsed after a start of this voltage increasing operation (NO at step S308), the procedure returns to step S305, and the voltage increasing operation is again performed.

In contrast, when the unit 15 receives data of the battery voltage Vb reaching the lower limit Tbd (NO at step S306), the unit 15 finishes this voltage increasing operation and performs the voltage dropping operation. Therefore, because the control unit 15 monitors the battery voltage Vb, the unit 15 can prevent the battery 11 from over-discharging the electric power. Further, when the unit 15 receives data of the capacitor voltage Vc increased to the upper limit Vcu (NO at step S307), the unit 15 finishes this voltage increasing operation and performs the voltage dropping operation. Therefore, because the control unit 15 monitors the capacitor voltage Vc, the unit 15 can prevent the capacitor voltage Vc from exceeding the withstand voltage and can prevent the capacitor 13 from being broken or damaged. Moreover, when the predetermined period has elapsed after a start of this voltage increasing operation before both the increase of the battery voltage Vb to the upper limit Tbu and the dropping of the capacitor voltage Vc to the lower limit Vcd (YES at step S308), the unit 15 finishes this voltage increasing operation and performs the voltage dropping operation. Therefore, because the control unit 15 measures the elapsing time of this voltage increasing operation, the unit 15 can prevent the capacitor from being saturated so as to reduce the calorific power generated in the battery 11.

In the voltage dropping operation, the capacitor voltage Vc is dropped, and the battery 11 is charged with the electric power of the capacitor 13 (step S309). Then, the unit 15 judges whether or not the battery voltage Vb is lower than the upper limit Tbu (step S310) When the battery voltage Vb is lower than the upper limit Tbu (YES at step S310), the unit 15 judges whether or not the capacitor voltage Vc is higher than the value of the driving voltage Vm (step S311). When the capacitor voltage Vc is higher than the value of the driving voltage Vm (YES at step S311), the unit 15 judges that the capacitor voltage Vc decreased in this voltage dropping operation is still sufficient to drive the motor 30A at the driving voltage Vm. Then, the unit 15 judges whether or not a predetermined period of time has elapsed after a start of the transfer of the electric power from the capacitor 13 to the battery 11 in this voltage dropping operation (step S312). Assuming that the voltage dropping operation is continued for the predetermined period, the SOC of the battery 11 becomes too high to receive more electric power in the battery 11. Therefore, the level of the current flowing through the battery 11 is reduced, the calorific power generated in the battery 11 is reduced, and the battery 11 cannot be efficiently warmed. When the predetermined period of time has not yet elapsed after a start of this voltage dropping operation (NO at step S312), the procedure returns to step S309, and the voltage dropping operation is again performed.

In contrast, when the unit 15 receives data of the battery voltage Vb increased to the upper limit Tbu (NO at step S310), the unit 15 finishes this voltage dropping operation. Therefore, the unit 15 can prevent the battery 11 from being broken or damaged due to the overcharging. Further, when the unit 15 receives data of the capacitor voltage Vc dropped to the value of the driving voltage Vm (NO at step S311), the unit 15 finishes this voltage dropping operation. Therefore, the unit 15 can prevent the inverter 20 from applying a voltage, converted from the capacitor voltage Vc so as to be lower than the driving voltage Vm determined at step S300, to the motor 30A. That is, the motor 30A can be reliably driven so as to run the vehicle or car at a desired speed. Moreover, when the predetermined period of time has elapsed after a start of this voltage dropping operation before both the increase of the battery voltage Vb to the upper limit Tbu and the dropping of the capacitor voltage Vc to the value of the driving voltage Vm (YES at step S312), the unit 15 finishes this voltage dropping operation. Therefore, because the control unit 15 measures the elapsing time of this voltage dropping operation, the unit 15 can prevent the battery 11 from being saturated so as to reduce the calorific power generated in the battery 11.

After this voltage dropping operation is finished, the control unit 15 judges whether or not the present time is a timing for determining a new driving voltage Vm applied to the motor 30A (step S313). This timing denotes a timing for determining the driving torque of the motor 30A. This timing is set to come every predetermined period of time such as several hundreds seconds. When it is a timing for determining a new driving voltage Vm (YES at step S313), the procedure returns to step S300. Therefore, the control unit 15 again judges based on a new driving voltage Vm whether or not this temperature increasing control should be continued. In contrast, when it is not a timing for determining anew driving voltage Vm (No at step S313), the procedure returns to step S302. Therefore, this temperature increasing control using the driving voltage Vm is continued on condition that the battery voltage Vb is higher than the value Vd.

Then, when the temperature Tb is increased to be equal to or higher than the value Tth (NO at step S304), it is not required to further warm the battery 11. Therefore, the unit 15 performs the normal control (step S314).

As described above, each time the battery voltage Vb is reduced to the lower limit Tbd or is decreased to the driving voltage Vm, the control unit 15 controls the converting unit 12 to change a transfer direction of the electric power between the battery 11 and the capacitor 13. More specifically, when the battery voltage Vb is reduced to the lower limit Tbd, the converting unit 12 changes a transfer of the electric power from the battery 11 to the capacitor 13 to a transfer of the electric power from the capacitor 13 to the battery 11 to supply electric power of the capacitor 13 to the battery 11. Further, when the capacitor voltage Vc is decreased to the driving voltage Vm, the converting unit 12 changes a transfer of the electric power from the capacitor 13 to the battery 11 to a transfer of the electric power from the battery 11 to the capacitor 13 to supply electric power of the battery 11 to the capacitor 13.

Accordingly, because the control unit 15 monitors the battery voltage Vb and the capacitor voltage Vc, a transfer of the electric power from the capacitor 13 to the battery 11 and a transfer of the electric power from the battery 11 to the capacitor 13 can be alternately performed while applying the driving voltage Vm, required to drive the motor 30A, to the motor 30A.

Effects obtained in this temperature increasing control for the battery 11 will be described with reference to FIG. 12 and FIG. 13. FIG. 12 shows a change of the capacitor voltage Vc and a change of the battery current Ib when no temperature increasing control is performed, while FIG. 13 shows a change of the capacitor voltage Vc and a change of the battery current Ib when the temperature increasing control is performed according to the third embodiment. Running conditions of the vehicle at a time when the changes shown, in FIG. 13 are measured are the same as running conditions of the vehicle at a time when the changes shown in FIG. 12 are measured.

As shown in FIG. 12, when no temperature increasing control is performed, the capacitor voltage Vc is changed within a range from a minimum value of the driving voltage Vm and a maximum value (e.g., 650V) of the driving voltage Vm which is required to run the vehicle according to running conditions of the vehicle. When the vehicle runs while generating a comparatively low level of driving torque in the motor 30A, a change of the capacitor voltage Vc is small. In contrast, when the vehicle runs at a high speed while generating a high level of driving torque in the motor 30A, the capacitor voltage Vc is increased to 650V which is the maximum value of the driving voltage Vm. The battery current Ib is changed with the capacitor voltage Vc. Because the capacitor voltage Vc depends on the running conditions of the vehicle, the battery current Ib is increased when the running conditions of the vehicle is largely changed. However, when the vehicle runs such that a change of the capacitor voltage Vc is small, a change of the battery current Ib is small. Therefore, the battery current Ib does not exceed −100 A or +100 A.

In contrast, when the temperature increasing control for the battery 11 is performed, as shown in FIG. 13, the capacitor voltage Vc is repeatedly increased and dropped between the value of the driving voltage Vm and the maximum value (e.g., 650V) of the driving voltage Vm, regardless of the running conditions of the vehicle. In FIG. 13, the area in which the capacitor voltage Vc is repeatedly increased and decreased appears as a black area between upper and lower values of Vc. Because the capacitor 13 is charged when the capacitor voltage Vc is dropped to the driving voltage Vm, the voltage required to drive the motor 30A can be reliably applied to the motor 30A. Further, a large level of battery current Ib flows through the battery 11, while changing the flow direction every short period of time, in response to the capacitor voltage Vc largely and quickly changed. That is, the battery current Ib flows so as to exceed −150 A or +150 A while changing the flow direction at a high frequency. Therefore, the battery 11 is quickly warmed by the battery current Ib.

As described, above, as compared with the battery current Tb obtained when no temperature increasing control is performed, because a large battery current Ib flows, while changing the flow direction at a high frequency, in the temperature increasing control, the battery 11 can be quickly warmed or heated.

In the view showing a change of the capacitor voltage Vc in FIG. 13, a time period A indicates a period of time in which the driving voltage Vm is equal to or higher than the value Vth (NO at step S301 in FIG. 11). During the time period A, no temperature increasing control is performed, but the normal control is performed. Therefore, the capacitor voltage Vc is not repeatedly increased and dropped during the time period A. After the time period A, the driving voltage Vm is reduced to be lower than the value Vth, and the capacitor voltage Vc is repeatedly increased and dropped.

As described above, in this embodiment, when the temperature increasing control is performed for the battery 11 during the running of an electric car such as a hybrid vehicle, the electric power is transferred between the battery 11 and the capacitor 13 so as to alternately perform a transfer of the electric power from the capacitor 13 to the battery 11 and a transfer of the electric power from the battery 11 to the capacitor 13 while placing the capacitor voltage Vc within a range from the value of the driving voltage Vm and the reference voltage value Vth.

Accordingly, the system 10A can prevent the capacitor voltage Vc from being lower than the value of the determined driving voltage Vm, and the system 10A can reliably apply the driving voltage Vm, required to drive the motor 30A, to the motor 30A. Therefore, the motor 30A driven at the driving voltage Vm can generate a driving torque required to run the car or vehicle at a desired speed.

Further, the transfer direction of the electric power between the battery 11 and the capacitor 13 is changed at a high frequency, the system 10A can rapidly warm the battery 11. Accordingly, the system 10A can rapidly warm the battery 11 while reliably applying the driving voltage Vm to the motor 30A.

Moreover, the system 10A controls the converting unit 12 to alternately transfer electric power from the capacitor 13 to the battery 11 and transfer electric power from the battery 11 to the capacitor 13 while placing the battery voltage Vb within a range from the upper limit Vbu to the lower limit Vbd. Accordingly, the system 10A can prevent the battery 11 from being overcharged or over-discharged.

Furthermore, the system 10A controls the converting unit 12 to change a transfer of the electric power from the battery 11 to the capacitor 13 to a transfer of the electric power from the capacitor 13 to the battery 11 when the capacitor voltage Vc is increased to the upper limit Vcu. Accordingly, the system 10A can prevent the capacitor 13 from being broken or damaged.

In the third embodiment, when the battery voltage Vb and the capacitor voltage Vc are always monitored regardless of the predetermined period of time at step S308 or S312, the voltage increasing and dropping operations alternately performed may be continued until at least one of the voltages Vb and Vc reaches one limit Vbd, Vcu, Vbu or Vm. Therefore, in this case, the judgment at step S308 and step S312 is not necessary.

Further, in the third embodiment, the u-phase current Iu is determined from the detected phase currents Iv and Iw to determine the driving voltage Vm. However, because the motor 30A is a three-phase motor, the phase currents Iu and Iv may be detected to determine the phase current Iw, or the phase currents Iu and Iw may be detected to determine the phase current Iv.

Moreover, in the third embodiment, the system 10A monitors the battery voltage Vb to change a transfer of the electric power from the capacitor 13 to the battery 11 (or the capacitor 13) to a transfer of the electric power from the battery 11 to the capacitor 13 (or the battery 11) and to prevent the battery 11 from being overcharged or over-discharged. However, the system 10A may monitor only the capacitor voltage Vc to place the capacitor voltage Vc between the driving voltage Vm and the upper limit Vcu.

Furthermore, in the third embodiment, the driving voltage Vm is determined from the power required to drive the motor 30A. However, when the rise of the battery temperature Tb is strongly desired, the capacitor voltage Vc may be reduced to be lower than the value of the driving voltage Vm. In this case, a larger battery current Ib can flow through the battery 11 to further rapidly warm or heat the battery 11.

The current consumer driving apparatus and the battery temperature rise causing system 10 or 10A described according to each of the first to third embodiments should not be construed as limiting the present invention to structures of the apparatus and system 10 or 10A, and the structure of this invention may be combined with that based on the prior art.

For example, the system 10 or 10A warms up the battery 11 while transferring electric power between the battery 11 and the capacitor 13. However, this driving apparatus is designed such that the battery 11 can be connected with a domestic power source through an on-board battery charger. Therefore, when the battery 11 is connected with an external capacitor through this on-board battery charger without being connected with any domestic power source, the system 10 or 10A may warm up the battery 11 while transferring electric power between the battery 11 and the external capacitor. Further, when the battery 11 is connected with an auxiliary battery through a DC/DC converter, the system 10 or 10A may warm up the battery 11 while transferring electric power between the battery 11 and the auxiliary battery.

Further, the system 10 or 10A is applied for electric cars such as a hybrid vehicle, a plug-in hybrid vehicle and the like. However, the system 10 or 10A can be applied for any device which is operated while using a chargeable power source.

What is claimed is:

1. A battery temperature rise causing system comprising:
   a rechargeable battery that holds electric power;
   an accumulator that accumulates the electric power received from the battery;
   a voltage converting unit that performs voltage conversion of the electric power between the battery and the accumulator; and
   a control unit that receives a battery temperature of the battery and controls the converting unit, when the received battery temperature is lower than a reference value, to increase the battery temperature while alternately transferring electric power from the accumulator to the battery and from the battery to the accumulator,
   wherein the control unit receives a battery voltage of the battery and controls the converting unit to change a transfer direction of the electric power between the battery and the accumulator each time the received battery voltage reaches a battery upper limit or a battery lower limit,
   the control unit receives an accumulated power voltage of the accumulator and controls the converting unit to change the transfer direction of the electric power between the battery and the accumulator each time the accumulated power voltage reaches an accumulator upper limit or an accumulator lower limit, and
   the control unit controls the converting unit to transfer the electric power from the accumulator to the battery when a predetermined period of time has elapsed from a start of the transfer of the electric power from the battery to the accumulator before the accumulated power voltage reaches the accumulator upper limit.

2. The system according to claim 1, wherein the control unit controls the converting unit to transfer the electric power from the battery to the accumulator in response to the battery voltage reaching the battery upper limit and to transfer the electric power from the accumulator to the battery in response to the battery voltage reaching the battery lower limit.

3. The system according to claim 1, wherein the control unit controls the converting unit to perform the transfer of the electric power from the accumulator to the battery in response to the accumulated power voltage reaching the accumulator upper limit and to perform the transfer of the electric power from the battery to the accumulator in response to the accumulated power voltage reaching the accumulator lower limit.

4. The system according to claim 1, wherein the control unit receives a conversion current flowing through the converting unit and controls the converting unit to change the transfer direction of the electric power between the battery and the capacitor accumulator each time the conversion current reaches a conversion upper limit.

5. The system according to claim 1, wherein the control unit controls the converting unit, when the voltage of the battery is lower than a predetermined value, to stop transferring the electric power between the battery and the accumulator.

6. A battery temperature rise causing system comprising:
   a rechargeable battery that holds electric power;
   an accumulator that accumulates the electric power received from the battery;
   a voltage converting unit that performs voltage conversion of the electric power between the battery and the accumulator; and
   a control unit that receives a battery temperature of the battery and controls the converting unit, when the received battery temperature is lower than a reference value, to increase the battery temperature while alternately transferring electric power from the accumulator to the battery and from the battery to the accumulator,
   wherein the control unit receives a battery voltage of the battery and controls the converting unit to change a transfer direction of the electric power between the battery and the accumulator each time the received battery voltage reaches a battery upper limit or a battery lower limit,
   wherein the control unit receives an accumulated power voltage of the accumulator and controls the converting unit to change the transfer direction of the electric power between the battery and the accumulator each time the accumulated power voltage reaches an accumulator upper limit or an accumulator lower limit,
   wherein the control unit controls the converting unit to transfer the electric power from the battery to the accumulator when a predetermined period of time has elapsed from a start of the transfer of the electric power from the accumulator to the battery before the accumulated power voltage reaches the accumulator lower limit.

7. The system according to claim 6, wherein the control unit controls the converting unit to transfer the electric power from the battery to the accumulator in response to the battery voltage reaching the battery upper limit and to transfer the electric power from the accumulator to the battery in response to the battery voltage reaching the battery lower limit.

8. The system according to claim 6, wherein the control unit controls the converting unit to perform the transfer of the electric power from the accumulator to the battery in response to the accumulated power voltage reaching the accumulator upper limit and to perform the transfer of the electric power from the battery to the accumulator in response to the accumulated power voltage reaching the accumulator lower limit.

9. The system according to claim 6, wherein the control unit receives a conversion current flowing through the converting unit and controls the converting unit to change the transfer direction of the electric power between the battery and the accumulator each time the conversion current reaches a conversion upper limit.

10. The system according to claim 6, wherein the control unit controls the converting unit, when the voltage of the battery is lower than a predetermined value, to stop transferring the electric power between the battery and the accumulator.

11. A battery temperature rise causing system, comprising:
    a rechargeable battery that holds electric power;
    an accumulator that accumulates the electric power received from the battery;

a voltage converting unit that performs voltage conversion of the electric power between the battery and the accumulator; and a control unit that receives a battery temperature of the battery and controls the converting unit, when the received battery temperature is lower than a reference value, to increase the battery temperature while alternately transferring electric power from the accumulator to the battery and from the battery to the accumulator, wherein the control unit stores in advance data indicating a relation between frequency in the transfer of the electric power and calorific power, generated in the battery due to the alternated transfer of the electric power, for each of levels of the battery temperature on condition that a battery voltage of the battery is lower than a battery upper limit and is higher than a battery lower limit, determines an optimum frequency at which the calorific power corresponding to the received battery temperature is maximized, and controls the converting unit to change a transfer direction of the electric power between the battery and the accumulator at the optimum frequency.

12. The system according to claim 11, wherein the control unit stores in advance the data indicating the relation between the frequency and the calorific power for each of levels of remaining capacity in the battery, selects the relation corresponding to a present level of remaining capacity, determines the optimum frequency, at which the calorific power corresponding to the received battery temperature is maximized, by using the selected relation, and controls the converting unit to change the transfer direction of the electric power at the optimum frequency.

13. The system according to claim 11, wherein the control unit changes a value of the optimum frequency in response to a change in a value of the received battery temperature, and controls the converting unit to change the transfer direction of the electric power at the optimum frequency set at the changed value.

14. A battery temperature rise causing system, comprising:
a rechargeable battery that holds electric power;
an accumulator that accumulates the electric power received from the battery;
a voltage converting unit that performs voltage conversion of the electric power between the battery and the accumulator; and
a control unit that receives a battery temperature of the battery and controls the converting unit, when the received battery temperature is lower than a reference value, to increase the battery temperature while alternately transferring electric power from the accumulator to the battery and from the battery to the accumulator,
wherein the control unit stores in advance data indicating a relation between frequency in the transfer of the electric power and battery current flowing through the battery, for each of levels of battery temperature on condition that a battery voltage of the battery is lower than a battery upper limit and is higher than a battery lower limit, determines an optimum frequency at which calorific power generated in the battery due to the alternated transfer of the electric power is maximized, by using the relation corresponding to the level of the received battery temperature, and controls the converting unit to change a transfer direction of the electric power between the battery and the accumulator at the optimum frequency.

15. The system according to claim 14, wherein the control unit stores in advance the data indicating the relation between the frequency and the battery current for each of levels of remaining capacity in the battery, selects the relation corresponding to an electric current level of remaining capacity, determines the optimum frequency, at which the calorific power corresponding to the received battery temperature is maximized, by using the selected relation, and controls the converting unit to change the transfer direction of the electric power at the optimum frequency.

16. The system according to claim 14, wherein the control unit changes a value of the optimum frequency in response to a change in a value of the received battery temperature, and controls the converting unit to change the transfer direction of the electric power between the battery and the accumulator at the optimum frequency set at the changed value.

17. A battery temperature rise causing system comprising:
a rechargeable battery that holds electric power;
an accumulator that accumulates the electric power received from the battery or accumulates electric power regenerated in an electric motor;
a voltage converting unit that performs voltage conversion of the electric power between the battery and the accumulator;
an inverter that converts an accumulated power voltage of the electric power accumulated in the accumulator into an alternating current voltage and applying the alternating current voltage to the electric motor to drive the electric motor during running of a vehicle; and
a control unit that receives a battery temperature of the battery and controls the converting unit, when the received battery temperature is lower than a reference value, to increase the battery temperature while alternately transferring electric power from the accumulator to the battery and transferring electric power from the battery to the accumulator,
wherein the control unit determines a driving voltage, required to drive the electric motor, according to a running condition of the vehicle, receives the accumulated power voltage of the accumulator and a battery voltage of the battery, and controls the converting unit according to the driving voltage, the accumulated power voltage and the battery voltage to alternately perform the transfers of the electric power,
wherein the control unit controls the converting unit to transfer the electric power from the accumulator to the battery in response to the accumulated power voltage reaching an upper limit and to transfer the electric power from the battery to the accumulator in response to the accumulated power voltage reaching a lower limit,
wherein the control unit controls the converting unit to transfer the electric power from the accumulator to the battery when a predetermined period of time has elapsed from a start of the transfer of the electric power from the battery to the accumulator before the accumulated power voltage reaches the upper limit.

18. The system according to claim 17, wherein, when the determined driving voltage is lower than a predetermined threshold value being equal to a maximum of a voltage required to drive the electric motor while the accumulated power voltage is higher than the determined driving voltage, the control unit controls the converting unit to alternately perform the transfers of the electric power.

19. The system according to claim 17, wherein the control unit controls the converting unit to transfer the electric power from the battery to the accumulator in response to the battery voltage reaching an upper limit and to transfer the electric power from the accumulator to the battery in response to the battery voltage reaching a lower limit.

20. A battery temperature rise causing system comprising:
a rechargeable battery that holds electric power;
an accumulator that accumulates the electric power received from the battery or accumulates electric power regenerated in an electric motor;
a voltage converting unit that performs voltage conversion of the electric power between the battery and the accumulator;
an inverter that converts an accumulated power voltage of the electric power accumulated in the accumulator into an alternating current voltage and applying the alternating current voltage to the electric motor to drive the electric motor during running of a vehicle; and
a control unit that receives a battery temperature of the battery and controls the converting unit, when the received battery temperature is lower than a reference value, to increase the battery temperature while alternately transferring electric power from the accumulator to the battery and transferring electric power from the battery to the accumulator,
wherein the control unit determines a driving voltage, required to drive the electric motor, according to a running condition of the vehicle, receives the accumulated power voltage of the accumulator and a battery voltage of the battery, and controls the converting unit according to the driving voltage, the accumulated power voltage and the battery voltage to alternately perform the transfers of the electric power,
wherein the control unit controls the converting unit to transfer the electric power from the accumulator to the battery in response to the accumulated power voltage reaching an upper limit and to transfer the electric power from the batter to the accumulator in response to the accumulated power voltage reaching a lower limit,
wherein the control unit controls the converting unit to transfer the electric power from the battery to the accumulator when a predetermined period of time has elapsed from a start of the transfer of the electric power from the accumulator to the battery before the accumulated power voltage reaches the lower limit.

21. The system according to claim 20, wherein, when the determined driving voltage is lower than a predetermined threshold value being equal to a maximum of a voltage required to drive the electric motor while the accumulated power voltage is higher than the determined driving voltage, the control unit controls the converting unit to alternately perform the transfers of the electric power.

22. The system according to claim 20, wherein the control unit controls the converting unit to transfer the electric power from the battery to the accumulator in response to the battery voltage reaching an upper limit and to transfer the electric power from the accumulator to the battery in response to the battery voltage reaching a lower limit.

* * * * *